US012689772B2

(12) United States Patent
Zhou et al.

(10) Patent No.: US 12,689,772 B2
(45) Date of Patent: Jul. 21, 2026

(54) IN-LOOP FILTERING METHOD, VIDEO ENCODING METHOD, VIDEO DECODING METHOD, ELECTRONIC DEVICE, AND MEDIUM

(71) Applicant: ZTE CORPORATION, Shenzhen (CN)

(72) Inventors: Yi Zhou, Shenzhen (CN); Wenjie Zou, Shenzhen (CN); Yaxian Bai, Shenzhen (CN); Cheng Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/698,250

(22) PCT Filed: Dec. 12, 2022

(86) PCT No.: PCT/CN2022/138425
§ 371 (c)(1),
(2) Date: Apr. 3, 2024

(87) PCT Pub. No.: WO2023/109766
PCT Pub. Date: Jun. 22, 2023

(65) Prior Publication Data
US 2024/0430488 A1 Dec. 26, 2024

(30) Foreign Application Priority Data

Dec. 14, 2021 (CN) ......................... 202111530227.3

(51) Int. Cl.
H04N 19/82 (2014.01)
H04N 19/117 (2014.01)
(Continued)

(52) U.S. Cl.
CPC ........... H04N 19/82 (2014.11); H04N 19/117 (2014.11); H04N 19/182 (2014.11); H04N 19/30 (2014.11); H04N 19/42 (2014.11)

(58) Field of Classification Search
CPC .... H04N 19/82; H04N 19/117; H04N 19/182; H04N 19/30; H04N 19/42
See application file for complete search history.

(56) References Cited

U.S. PATENT DOCUMENTS 11,979,565 B2 * 5/2024 Ding ........................ G06N 3/04
2019/0273948 A1 9/2019 Yin et al.
(Continued)

FOREIGN PATENT DOCUMENTS

CN 103141094 A 6/2013
CN 105794206 A 7/2016
(Continued)

OTHER PUBLICATIONS

International Search Report in Application No. PCT/CN2022/138425, dated Feb. 24, 2023, 4 pages, including translation.
(Continued)

*Primary Examiner* — Dave Czekaj
*Assistant Examiner* — Shanika M Brumfield
(74) *Attorney, Agent, or Firm* — Morgan, Lewis & Bockius LLP

(57) ABSTRACT

A loop filtering method, a video encoding method, a video decoding method, an electronic device, and a medium are provided. The loop filtering method includes: acquiring a first reconstructed video unit processed by a loop filter; performing pixel classification on the first reconstructed video unit; determining a scale factor corresponding to each class; and performing scale adjustment on the first reconstructed video unit according to the scale factor, so as to obtain a second reconstructed video unit.

18 Claims, 11 Drawing Sheets

(51) Int. Cl.
   H04N 19/182 (2014.01)
   H04N 19/30 (2014.01)
   H04N 19/42 (2014.01)

(56) References Cited

U.S. PATENT DOCUMENTS

| | | | | |
|---|---|---|---|---|
| 2020/0204801 A1* | 6/2020 | Hu | ..................... | H04N 19/176 |
| 2020/0404335 A1* | 12/2020 | Egilmez | ............... | H04N 19/17 |
| 2021/0021820 A1 | 1/2021 | Ikai et al. | | |
| 2021/0099710 A1* | 4/2021 | Salehifar | ............... | H04N 19/46 |
| 2021/0152841 A1* | 5/2021 | Hu | ..................... | H04N 19/44 |
| 2021/0400311 A1* | 12/2021 | Hsiao | ................... | H04N 19/80 |
| 2022/0101095 A1* | 3/2022 | Li | ..................... | G06N 3/042 |
| 2022/0103816 A1* | 3/2022 | Karczewicz | .......... | H04N 19/70 |
| 2022/0103864 A1* | 3/2022 | Wang | .................... | H04N 19/70 |
| 2022/0248006 A1* | 8/2022 | Lim | ................... | H04N 19/176 |

FOREIGN PATENT DOCUMENTS

| | | |
|---|---|---|
| CN | 111711825 A | 9/2020 |
| JP | 2013534388 A | 9/2013 |
| JP | 2021520104 A | 8/2021 |
| WO | WO 2021/051369 A1 | 3/2021 |
| WO | WO-2021244884 A1 * 12/2021 | ............. G06N 3/045 |
| WO | WO-2022072659 A1 * 4/2022 | ............. G06N 3/045 |

OTHER PUBLICATIONS

Office Action in Japanese Application No. 2024-526672, dated Jun. 2, 2025, 15 pages, including translation.

Extended European Search Report in Application No. 22906511.5, dated Aug. 13, 2025, 10 pages.

Santamaria Maria et al., "Content-adaptive convolutional neural network post-processing filter", 2021 IEEE International Symposium on Multimedia (ISM), IEEE, Nov. 29, 2021, pp. 99-106, XP033999908, DOI: 10.1109/ISM52913.2021.00025.

Wang et al., "AHG11: Neural Network-based In-Loop Filter", 20. JVET Meeting; Oct. 7, 2020-Oct. 16, 2020; Teleconference; (The Joint Video Exploration Team of ISO/IEC JTC1/SC29/WG11 and ITU-T SG.16 ), No. JVET-T0079, Oct. 1, 2020, XP030289879, Retrieved from the Internet: URL:http://phenix.int-evry.fr/jvet/doc_end_user/documents/20_Teleconference/wg11/JVET-T0079-v1.zip JVET-T0079-v1.docx.

First Office Action in Korean Application No. 10-2024-7014874 dated Feb. 5, 2026, 10 pages, including translation.

* cited by examiner

| Filter a reconstructed picture of a current picture to obtain a first reconstructed picture | 210 |
| Use a loop filtering method to filter the first reconstructed picture to obtain a second reconstructed picture | 220 |
| Flag loop filtering control information of the loop filtering method in a bit stream based on the filtering process | 230 |

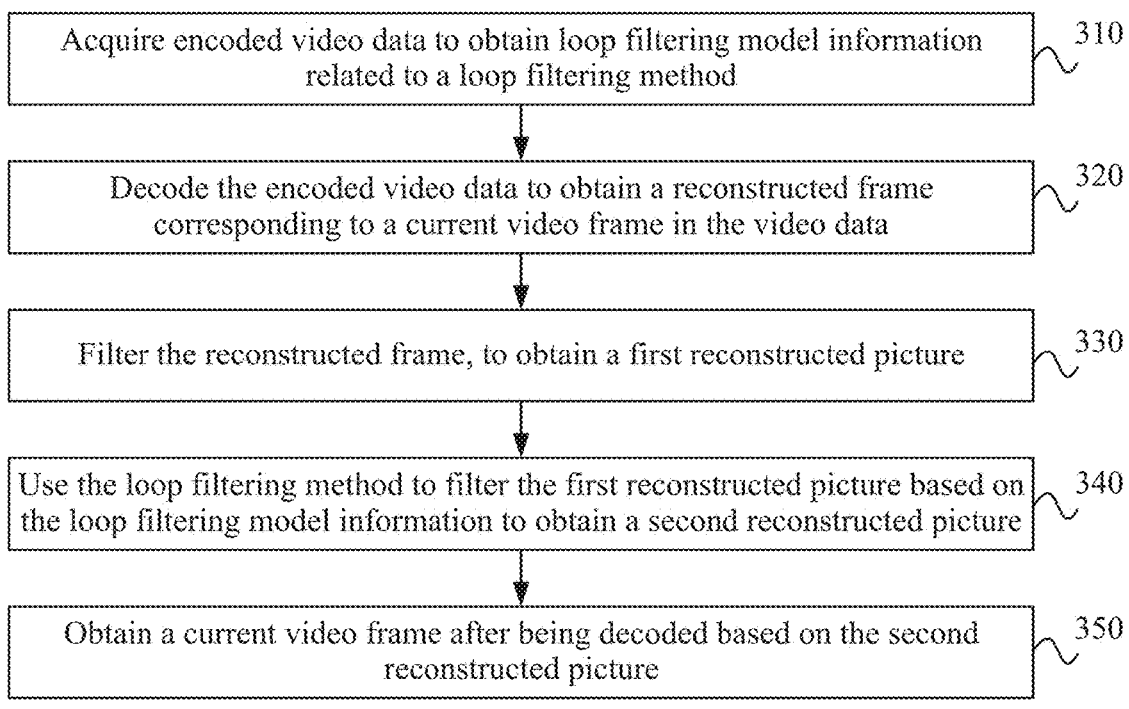

Acquire encoded video data to obtain loop filtering model information related to a loop filtering method   310

Decode the encoded video data to obtain a reconstructed frame corresponding to a current video frame in the video data   320

Filter the reconstructed frame, to obtain a first reconstructed picture   330

Use the loop filtering method to filter the first reconstructed picture based on the loop filtering model information to obtain a second reconstructed picture   340

Obtain a current video frame after being decoded based on the second reconstructed picture   350

FIG. 14

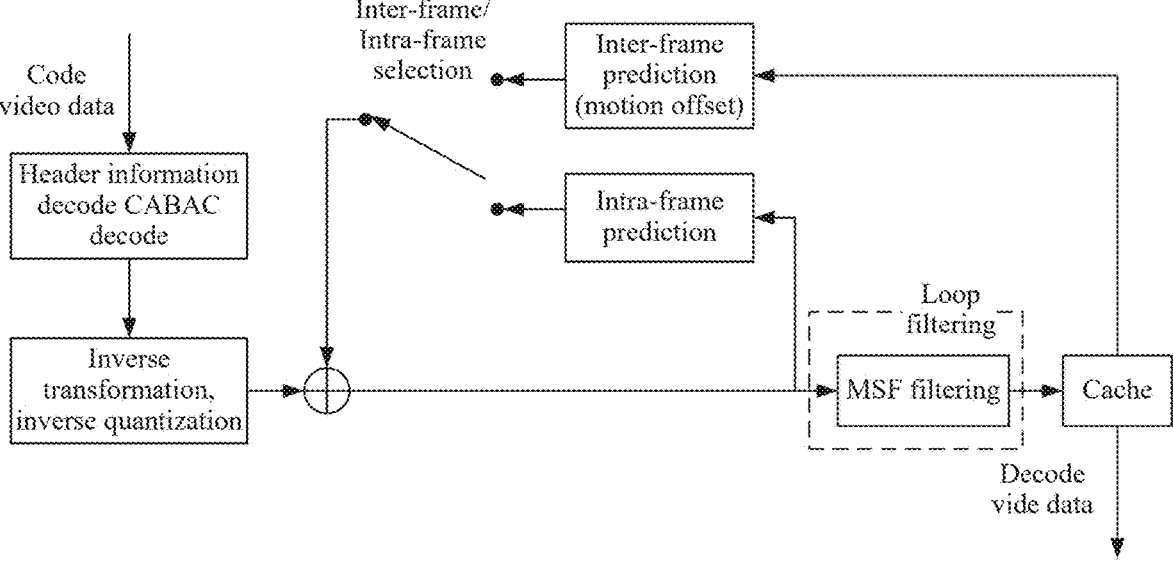

FIG. 15

IN-LOOP FILTERING METHOD, VIDEO ENCODING METHOD, VIDEO DECODING METHOD, ELECTRONIC DEVICE, AND MEDIUM

CROSS-REFERENCE TO RELATED APPLICATIONS

This is a National Stage Application filed under 35 U.S.C. 371 based on International Patent Application No. PCT/CN2022/138425, filed on Dec. 12, 2022, which claims priority to Chinese Patent Application No. 202111530227.3 filed on Dec. 14, 2021, disclosures of both of which are incorporated herein by reference in their entireties.

TECHNICAL FIELD

The present application relates to the technical field of picture processing technology, for example, to a loop filtering method, a video encoding method, a video decoding method, an electronic device and a medium.

BACKGROUND

In-loop filtering technology can improve picture compression efficiency, improve picture encoding quality, and reduce decoding errors through multi-layer picture reconstruction. However, filtering models in related technologies are generally offline networks, and has no original picture serving as a reference when used practically. Therefore, there will be issues with the scale being too strong or too weak in the process of filtering, resulting in a large error of the reconstructed value with respect to the original value, adversely affecting filtering effect.

SUMMARY

A loop filtering method, a video encoding method, a video decoding method, an electronic device and a medium are provided according to the present application.

A loop filtering method according to an embodiment of the present application includes as follows.

A first reconstructed video unit processed by a loop filter is acquired.

Pixel classification is performed on the first reconstructed video unit.

A scale factor corresponding to each class is determined.

Scale adjustment is performed on the first reconstructed video unit according to the scale factor, to obtain a second reconstructed video unit.

A video encoding method is further provided according to an embodiment of the present application, which includes as follows.

A reconstructed picture of a current picture is filtered to obtain a first reconstructed picture.

A loop filtering method is used to filter the first reconstructed picture to obtain a second reconstructed picture.

Loop filtering control information of the loop filtering method is flagged in a bit stream based on the filtering process. Specifically, the first reconstructed picture includes a first reconstructed video unit, the second reconstructed picture includes a second reconstructed video unit, and the loop filtering method is determined according to the loop filtering method described above.

A video decoding method is further provided according to an embodiment of the present application, which includes as follows.

A bit stream containing an encoded video sequence is acquired to obtain loop filtering control information related to a loop filtering method.

A reconstructed picture of a current picture is filtered to obtain a first reconstructed picture.

A loop filtering method is used to filter the first reconstructed picture based on the loop filtering control information to obtain a second reconstructed picture.

Specifically, the first reconstructed picture includes a first reconstructed video unit, the second reconstructed picture includes a second reconstructed video unit, and the loop filtering method is determined according to the loop filtering method described above.

An electronic device is further provided according to an embodiment of the present application, which includes a memory, a processor, and a computer program stored in the memory and executable on the processor, the processor, when executing the program, implements the loop filtering method described above, or the video encoding method described above, or the video decoding method described above.

A computer-readable storage medium is further provided according to an embodiment of the present application, on which a computer program is stored. The computer program, when being executed by a processor, implements the loop filtering method described above, or the video encoding method described above, or the video decoding method described above.

BRIEF DESCRIPTION OF DRAWINGS

FIG. 14 is a flow chart of a video decoding method according to an embodiment;

FIG. 15 is a schematic diagram of a decoding end framework according to an embodiment;

DETAILED DESCRIPTION

Figure 1:
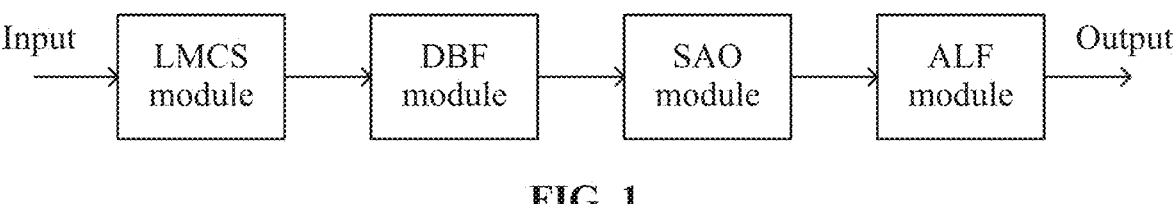
FIG. 1 is a schematic diagram of a loop filtering according to an embodiment.

In the compressed video of the new generation video encoding standard H.266, also known as versatile video encoding (VVC), there are distortion effects such as blocking artifacts, ringing effects, color deviations, and picture blur. In order to reduce the impact of these distortions on video quality, an in-loop filtering technology can be used to filter video frames. FIG. 1 is a schematic diagram of a loop filtering according to an embodiment. As shown in FIG. 1, luma mapping with chroma scaling (LMCS), deblocking filtering (DBF), pixel adaptive offset (SAO) and/or adaptive loop filtering (ALF) can be used to process an input original picture and output a reconstructed picture. Specifically, the LMCS can improve compression efficiency by re-assigning codes to information within the dynamic range; the DBF can be used to reduce the blocking artifacts; the SAO can be used to eliminate ringing effects; and the ALF can reduce decoding errors.

In this embodiment of the present application, a filtering method based on neural networks (NN) may also be used in the loop filtering process. The NN filtering can be added to the loop filtering as a new module or operation, or it can replace the modules or operations of DBF and SAO to save transmission overhead and ensure picture quality; after the NN filtering, the ALF can be used to further improve picture performance.

In this embodiment of the present application, in the process of loop filtering, the scale adjustment can be performed for the picture, for example, the luma and/or chroma of the pixels in the video frame can be adjusted. In addition, if there are too many pixels in a frame of picture, and when using one straight line to fit, the scale adjustment requirements of only some pixels can be met, which may cause some counterproductive effects. For example, a certain pixel is required to be enhanced, but based on the fitting result, the scale of this pixel is weakened, which results in more deviation of the reconstructed value with respect to the original value introduced in the process of scale adjustment, resulting in deterioration in picture quality and adversely affecting the filtering effect. In this embodiment of the present application, scale factors of different classes can be determined through pixel classification, thereby providing a flexible scale adjustment method.

Figure 2:
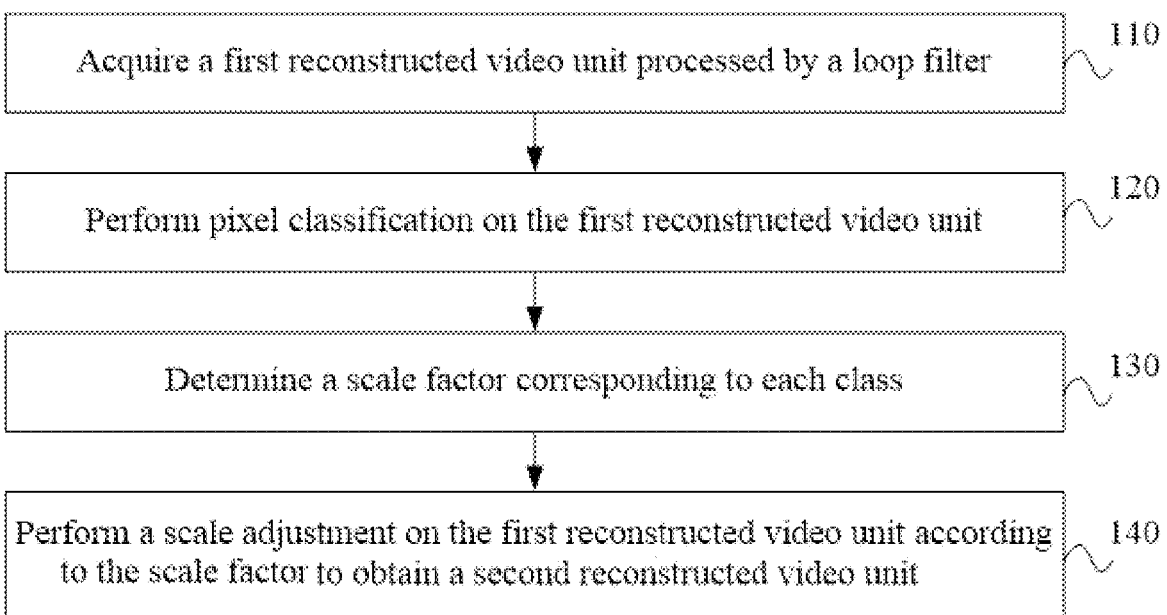
FIG. 2 is a flow chart of a loop filtering method according to an embodiment.

In this embodiment of the present application, a loop filtering method is provided, which is mainly applicable to an encoding end and is also applicable to a decoding end. In the process of video encoding or decoding, the loop filtering method can be used to filter the reconstructed picture in the video. FIG. 2 is a flow chart of a loop filtering method according to an embodiment. As shown in FIG. 2, the method according to this embodiment includes: operations 110, 120, 130 and 140.

In the operation 110, a first reconstructed video unit processed by a loop filter is acquired.

In this embodiment, the loop filter may refer to a model used to filter an input picture, and supports multiple filtering methods, such as NN, LMCS, DBF, SAO and/or ALF filtering. A video unit can be one or more frames of pictures in a video, or may be one or more slices in a video. The first reconstructed video unit is obtained after an input picture is processed by the loop filtering.

In the operation 120, pixel classification is performed on the first reconstructed video unit.

In this embodiment, the first reconstructed video unit can be divided into multiple classes according to set rules, for example, according to the luma, chroma, region of pixels in the first reconstructed video unit and/or types of loop filters, etc., then, scale adjustment is performed on pixels of different classes by using corresponding scale factors rather than performing scale adjustment on all the pixels in the first reconstructed video unit by using the same scale factor, so that all pixels in the first reconstructed video unit can be subjected to appropriate scale adjustment, thereby ensuring filtering effects.

In the operation 130, a scale factor corresponding to each class is determined.

In this embodiment, the scale factor is the main parameter for scale adjustment on the luma and/or chroma of a pixel. Scale factors of different magnitudes correspond to different adjustment amplitudes. The scale factors corresponding to all the classes respectively can be the same or different. The scale factor corresponding to each class can be calculated based on the differences in pixel values of pixels in this class before and after the filtering process. For example, a straight line is obtained by fitting the differences in pixel values of pixels in this class before and after the filtering process, and the scale factor of this class is determined according to the slope of the straight line. It is to be noted that the fitting is performed for each class to obtain the corresponding straight line, thereby increasing the diversity of scale factors and enabling flexible scale adjustment for different classes. For another example, at a decoding end, the scale factors corresponding to the classes respectively can be obtained not through calculation but through parsing encoded video data.

In the operation 140, scale adjustment is performed on the first reconstructed video unit according to the scale factor, to obtain a second reconstructed video unit.

In this embodiment, corresponding scale factors can be used for scale adjustment on different classes. This operation of scale adjustment based on pixel classification and scale factors of the classes can be referred to as multi-scale factor (MSF) operation; in addition, the luma and/or chroma components of pixels in each class can be adjusted. MSF filtering can be applied to the entire filtered picture, and can also be applied to a single or multiple slices in the picture, or to the sole luma component or the sole chroma component. The second reconstructed video unit after being subjected to the scale adjustment can be used as a reference and basis for subsequent encoding.

Figure 3:
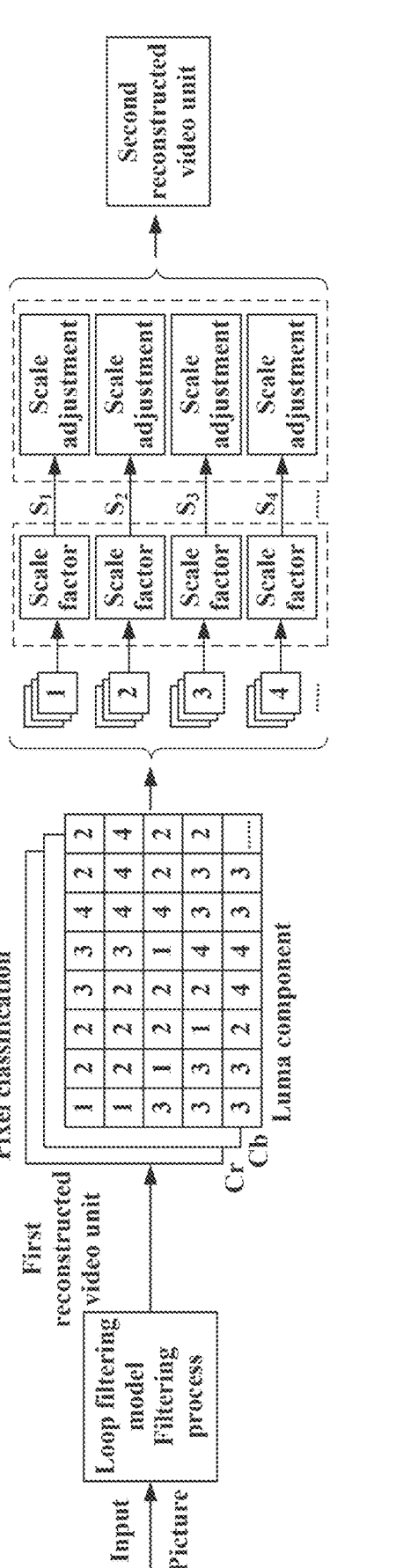
FIG. 3 is a schematic diagram of a multi-scale factor operation according to an embodiment.

FIG. 3 is a schematic diagram of a multi-scale factor operation according to an embodiment. As shown in FIG. 3, the loop filter is an NN filter. After an input picture is filtered by the NN filter, a first video reconstructed unit is obtained. Pixel classification is performed for the first video reconstructed unit, and the pixel classification can be performed according to chroma (including a blue color difference component Cb and a red color difference component Cr) and/or luma components. Specifically, the digital identification is used to indicate the class to which each pixel falls. For example, the pixels with the numerical identification "1" fall into the same class, and FIG. 3 shows total four classes from 1 to 4; then for each class, the corresponding scale factors are calculated respectively, recorded as S1, S2, S3 and S4 respectively, and the scale factors corresponding to all the classes respectively are used to perform scale adjustment on the pixels of the corresponding classes, to obtain a second video reconstructed unit.

The loop filtering method according to this embodiment can be understood as a multi-scale factor filtering method based on pixel classification. In the method, the second reconstructed video unit is obtained after scale adjustment is performed on the first reconstructed video unit based on the classes, thereby, the deviations of the reconstructed values in the second reconstructed video unit with respect to the original values are smaller, and the second reconstructed video unit has less distortion, a higher picture quality and a better filtering effect.

In an embodiment, the loop filter includes a neural network-based loop filter (i.e., NN Filter). In this embodiment, the NN filter uses a deep learning-based method to analyze the data and establish a mapping from a distorted picture (or reconstructed picture) to an original picture, thereby enhancing the picture quality. NN filters are generally offline networks. In practical use of an NN filter, no original picture is used as a reference, and there may be issues that the scales are too strong or too weak. In this embodiment, by classifying pixels and introducing the scale factor for each class, the scales of pixels can be flexibly controlled. For the NN filter, various data that is required to be input to the neural networks can be configured, such as reconstructed picture samples, quantization parameter (QP) information, code unit (CU) division information, deblocking filtering information, prediction samples, etc., these data is input into the NN filter, and the first reconstructed video unit after being processed by the NN filtering is output.

In an embodiment, the reconstructed video unit includes a reconstructed picture, slice, code block, or code tree block. The reconstructed video unit may be the first reconstructed video unit or the second reconstructed video unit.

In an embodiment, the performing scale adjustment on the first reconstructed video unit according to the scale factor includes at least one of the following:

performing scale adjustment on a luma component of the first reconstructed video unit according to the scale factor (as shown in FIG. 3);

performing scale adjustment on a first chroma component (e.g., Cb) of the first reconstructed video unit according to the scale factor; and performing scale adjustment on a second chroma component (e.g., Cr) of the first reconstructed video unit according to the scale factor.

In an embodiment, the determining a scale factor corresponding to each class includes: operations 131 and 133.

In the operation 131, pixels of the same class are integrated into the same coordinate diagram, specifically, a horizontal ordinate of each pixel is an output of the respective pixel after passing through the loop filter, and a vertical ordinate of each pixel is an input of the respective pixel before passing through the loop filter.

In the operation 133, the pixels in the coordinate diagram are fitted based on the least squares method to obtain a straight line, and a slope of the straight line is taken as the scale factor corresponding to the respective class.

In this embodiment, the scale factor of each class can be obtained through calculation and is applicable to the encoding end. FIG. 3 is taken as an example. Pixel classification is performed on the first reconstructed video unit after the NN filtering. For one of the classes, an output of pixels falling into this class after being subjected to the NN filtering is used as a horizontal ordinate, and an input of pixels falling into this class before being subjected to the NN filtering is used as a vertical coordinate, thereby placing the pixels falling into the same class in the first reconstructed video unit into the same coordinate diagram; then the least squares method is used for fitting to obtain a straight line, and the slope of this straight line is the scale factor corresponding to this class. The number of classes corresponds to the number of scale factors obtained. By fitting a straight line with the least squares method, the reconstructed picture processed by the loop filter can be made approximate to the original picture, achieving the effects of adapting the filtering scales to the original picture.

For the $class^{th}$ class, the calculation formula of its scale factor $S_{class}$ is as follows:

$$S_{class} = \frac{N_{class}\left(\sum_i x_i y_i\right) - \left(\sum_i x_i\right)\left(\sum_i y_i\right) + \beta}{N_{class}\left(\sum_i x_i\right) - \left(\sum_i y_i\right) + \beta};$$

where $N_{class}$ is the number of pixels falling into the $class^{th}$ class, $x_i$ is $NN(rec_i) - rec_i$, $y_i$ is $org_i - rec_i$, $rec_i$ is an input of the NN filter of the $i^{th}$ pixel, $NN(rec_i)$ is an output of the NN filter of the $i^{th}$ pixel, $org_i$ is an original pixel value of the $i^{th}$ pixel; the value of $\beta$ is related to $N_{class}$, and in this embodiment, $$\beta = 0.1 N_{class}^2.$$

In an embodiment, the determining a scale factor corresponding to each class includes: determining the scale factor corresponding to each class by reading loop filtering control information related to the loop filtering method.

In this embodiment, the scale factor of each class can also be read from the loop filtering control information related to the loop filtering method by parsing the high-level syntax of the bit stream, which is applicable to the decoding end.

In an embodiment, the performing scale adjustment on the first reconstructed video unit according to the scale factor includes as follows.

For each pixel in each class, a difference between the output of the respective pixel after passing through the loop filter and the input of the respective pixel before passing through the loop filter is multiplied with the scale factor corresponding to the respective class, and the multiplication result is added to the input of the respective pixel before passing through the loop filter to obtain an adjusted pixel value of the respective pixel.

In this embodiment, the scale factor corresponding to each class is used to limit the scale of the NN filtering. The scale adjustment formula is as follows: $rec_{NN} = (NN(rec)_{class} - rec)*s_{class} + rec$, where rec is an input of the NN filter, $NN(rec)_{class}$ is an output of the NN filter, class represents a class number corresponding to the NN(rec), and $s_{class}$ is a scale factor corresponding to the $class^{th}$ class.

In an embodiment, a pixel classification method includes at least one of the following:

performing pixel classification based on luma components;

performing pixel classification based on first chroma components;

performing pixel classification based on second chroma components;

performing pixel classification based on block classification modes;

performing pixel classification based on pixel regions;

performing pixel classification based on classes of neural network-based loop filters (NN filter);

performing pixel classification based on classification modes used by deblocking filtering (DBF);

performing pixel classification based on classification modes used by sample adaptive offset (SAO) filtering; or performing pixel classification by neural networks for pixel classification.

In this embodiment, the pixel classification can be performed based on the luma components, based on the block classification modes of ALF, in addition, can also support multiple classification methods in consideration with factors such as NN filtering, DBF filtering, and SAO filtering, chroma components, pixel regions of the picture.

For example, based on the block classification mode of ALF, pixels are classified according to a directionality factor and/or activity factor of each pixel block. Five kinds of directionality factors and five kinds of activity factors are taken as an example, the first reconstructed video unit can be divided into 25 classes according to the directionality factors and the activity factors, the first reconstructed video unit can also be divided into 5 classes according to the activity factors, and the first reconstructed video unit can also be divided into 5 classes according to the directionality factors.

For another example, the pixel classification is performed based on luma component regions where the pixels are located, for example, the first reconstructed video unit is divided into 8 regions, that is, into 8 classes, and it tries to ensure that the numbers of code units in the classes are equal to each other.

For another example, the pixel classification is performed based on NN filters. For example, in the process of loop filtering, different NN filters may be selected for different pixel blocks, and the pixel blocks are classified according to the NN filters used in the blocks.

For another example, based on the classification of other filtering models, for example, the first reconstructed video unit can be divided into different classes according to the classification mode used by DBF and/or SAO filtering.

For another example, neural networks can be used for pixel classification, for example, neural networks for pixel classification are trained, whose input includes pixel values of the first reconstructed video unit, parameters of the loop filter and other information, and output is a result of the pixel classification.

Furthermore, classification can also be performed based on chroma components, for example, classification is performed based on chroma component regions of pixels. For example, the first reconstructed video unit is divided into eight regions, that is, divided into 8 classes, and it tries to ensure that the classes have the same number of code units.

For another example, classification is performed according to at least one chroma component of Cb and Cr, and pixels with the same Cb and/or Cr are classified into one class.

For another example, with reference to the pixel classification information of the luma components, the first reconstructed video unit is further divided into different classes according to the chroma components.

In an embodiment, the performing pixel classification based on block classification modes includes operations 1210, 1220 and 1230.

In the operation 1210, pixel blocks of the first reconstructed video unit are acquired.

In the operation 1220, a Laplacian gradient of each of the pixel blocks is calculated, and a directionality factor and an activity factor are calculated based on the Laplacian gradient.

In the operation 1230, a class of the respective pixel block is determined based on at least one of the directionality factor and the activity factor, and classes of all pixels in the reconstructed video unit are determined.

In this embodiment, pixel classification is performed based on the block classification mode in the ALF filtering. According to the luma component of the first reconstructed video unit, a 4×4 pixel block (or luma block) is taken as an example, for each 4×4 pixel block, the one-dimensional Laplace operator gradients of each pixel, in surrounding 8×8 pixel blocks centered on this block, in directions of horizontal 0°, vertical 90°, 135°, and 45° are calculated. For reducing the calculation complexity, the calculation can be performed only for part of pixels whose horizontal ordinate and vertical ordinate are even numbers or neither, and gradients of those pixels in directions of horizontal 0°, vertical 90°, 135°, and 45° are calculated to obtain $g_h$, $g_v$, $g_{d1}$ and $g_{d2}$ respectively.

A directionality factor D reflects the direction of the gradient. First, the ratios of the maximum and minimum gradients in the horizontal and vertical directions are calculated based on $g_h$ and $g_v$ to obtain $r_{h,v}$. Then the ratio of the maximum and minimum gradients in the diagonal direction is calculated based on the diagonal gradient values $g_{d1}$ and $g_{d2}$, to obtain $r_{d0,d1}$ and then the $r_{h,v}$ and $r_{d0,d1}$ are each compared with the thresholds t1=2, t2=4.5, to obtain the directionality factor D.

(1) If $r_{h,v} \le t1$ and $r_{d0,d1} \le t1$, $D = 0$;

(2) if $r_{h,v} \le r_{d0,d1}$, and $t1 < r_{d0,d1} \le t2$, $D = 1$;

(3) if $r_{h,v} \le r_{d0,d1}$, and $r_{d0,d1} > t2$, $D = 2$;

(4) if $r_{h,v} \ge r_{d0,d1}$, and $t1 < r_{h,v} \le t2$, $D = 3$;

(5) if $r_{h,v} \ge r_{d0,d1}$, and $r_{h,v} > r_{h,v} > t2$, $D = 4$;

the activity factor A reflects the strong and weak of the gradient and can be obtained by looking up the table according to $g_h$ and $g_v$.

Then the class identifier into which the 4×4 pixel block falls can be expressed as: filtIdx=5*D+A.

It is to be noted that when there are too many classes of pixels, it may cause the transmission overhead of the video encoding loop filtering bit stream to increase; and for some classes, the scale adjustment operation may not bring performance gains or even cause the encoding performance to deteriorate. Therefore, some class-based competition decision-making mechanisms and scale adjustment switch control strategies are further provided according to the embodiments of this application.

In an embodiment, the performing scale adjustment on the first reconstructed video unit according to the scale factor includes: operations 1401 and 1403.

In the operation 1401, for pixels of each class, costs of pixels after being subjected to the scale adjustment by using a scale factor corresponding to the respective class with respect to the original pixels are calculated.

In the operation 1403, according to costs corresponding to pixels of multiple classes, scale factors corresponding to part of classes of the multiple classes are used to perform scale adjustment on the pixels of the corresponding classes.

In this embodiment, for multiple classes, it may further determine, according to the degrees of distortion between the scale-adjusted pixels and the original pixels, that is, the costs, on which classes of pixels the scale adjustment is performed. On the basis of performing pixel classification on the first reconstructed video unit and determining the scale factor of each class, the scale adjustment is performed by using the scale factors for the corresponding classes of pixels, to calculate the cost corresponding to the pixels of each class. The class with a less cost may be selected to be subjected to the scale adjustment, while the class with a large cost may not be subjected to the scale adjustment. For example, for the class with a cost higher than a threshold, a corresponding scale factor is used to perform the scale adjustment on the pixels of the corresponding class. For another example, the costs of the classes are ordered from small to large, and for five classes with the least costs, corresponding scale factors are used to perform the scale adjustment on the pixels of the corresponding classes, thereby improving the flexibility of the scale adjustment and the picture quality.

In an embodiment, the performing scale adjustment on the first reconstructed video unit according to the scale factor includes: operations 1411, 1413 and 1415.

In the operation 1411, a first cost of a picture obtained after pixels of classes are subjected to scale adjustment by using a single scale factor with respect to the original picture is calculated.

In the operation 1413, a second cost of a picture obtained after pixels of classes are subjected to scale adjustment by using scale factors corresponding to the respective classes with respect to the original picture is calculated.

In the operation 1415, according to the first cost and the second cost, scale adjustment is performed on the first reconstructed video unit by using the single scale factor, or scale adjustment is performed on the pixels of the classes by using the scale factors corresponding to the respective classes respectively.

In this embodiment, a single scale factor may be selected to perform scale adjustment on the classes, or scale factors corresponding to the classes may be used to perform the scale adjustment on the corresponding classes of pixels. For example, one scale factor may be determined for the first reconstructed video unit, and a first cost of a picture obtained after the first reconstructed video unit is subjected to scale adjustment by using this scale factor with respect to the original picture is calculated. Then, on the basis of performing pixel classification on the first reconstructed video unit and determining the scale factor of each class, scale adjustment is performed by using the scale factors for the corresponding classes of pixels, and then a second cost of a picture obtained after the first reconstructed video unit is subjected to this scale adjustment with respect to the original picture is calculated. The first cost is compared with the second cost, and the scale adjustment is performed according to the scale adjustment mode having a less cost, thereby improving the flexibility of the scale adjustment and the picture quality.

In an embodiment, the single scale factor is a value set according to statistical information; or, the single scale factor is determined based on a slope of a straight line obtained by fitting each pixel in the first reconstructed video unit.

In this embodiment, the single scale factor can be obtained by calculating for the first reconstructed video unit. For example, all pixels in the first reconstructed video unit are placed in the same coordinate diagram, a straight line is obtained by fitting based on all the pixels, and the slope of the straight line is used as a single scale factor. The single scale factor can also be a preset scale factor, for example, an appropriate scale factor set based on statistical information.

In an embodiment, the performing scale adjustment on the first reconstructed video unit according to the scale factor includes: operations 1421, 1422, 1423, 1424 and 1425.

In the operation 1421, a second cost of a video unit obtained after pixels of classes are subjected to scale adjustment by using scale factors corresponding to the respective classes with respect to the original video unit is calculated.

In the operation 1422, classes whose corresponding scale factor differences are within a set range are fused into one class.

In the operation 1423, a scale factor corresponding to each fused class is determined.

In the operation 1424, a third cost of a video unit obtained after pixels of fused classes are subjected to scale adjustment by using scale factors corresponding to the respective fused classes with respect to the original video unit is calculated.

In the operation 1425, according to the second cost and the third cost, scale adjustment is performed on the pixels of the multiple classes by using the scale factors corresponding to the respective classes respectively, or scale adjustment is performed on the pixels of the multiple fused classes by using the scale factors corresponding to the respective fused classes respectively.

In this embodiment, scale factors corresponding to the classes may be used to perform the scale adjustment on the corresponding classes of pixels, the classes may also be fused to reduce the number of classes, reduce the calculation amount, and improve efficiency and effects of the scale adjustment. For example, on the basis that pixel classification is performed on the first reconstructed video unit and the scale factor of each class is determined, scale adjustment is performed by using the scale factors for the corresponding classes of pixels, and the second cost is calculated. Furthermore, the classes are fused, for example, for some classes having similar scale factors (for example, the difference between the scale factors does not exceed a specified range), thus, these classes can be fused into one class, then the scale factor of each fused class is calculated (for example, pixels of classes fused into one class are placed into one coordinate diagram, fitting is performed on the pixels to obtain a straight line, and the slope of the straight line is calculated to obtain the scale factor of the fused class). A third cost of a video unit obtained after pixels of fused classes are subjected to scale adjustment by using scale factors corresponding to the respective fused classes with respect to the original video unit is calculated. The second cost is compared with the third cost, and the scale adjustment is performed according to the scale adjustment mode having a less cost, thereby improving the flexibility of the scale adjustment and the picture quality.

In an embodiment, the performing scale adjustment on the first reconstructed video unit according to the scale factor includes: operations 1431, 1432 and 1433.

In the operation 1431, for pixels of each class, costs of pixels after being subjected to scale adjustment by using the scale factor corresponding to the respective class with respect to the original pixels are calculated.

In the operation 1432, according to costs corresponding to the pixels of multiple classes, switch statuses of scale adjustment corresponding to the multiple classes respectively are flagged by using scale adjustment switch flags.

In the operation 1433, according to the scale adjustment switch flags, scale factors corresponding to classes for which the scale adjustment is turned on are used to perform scale adjustment on pixels of the respective classes.

In this embodiment, the scale adjustment switch flag (Flag) is set for each class; thereby the scale adjustment switch of each class can be controlled to achieve the purpose of adjusting the scale of the desired class.

For multiple classes, it can be further determined which classes have the scale adjustment turned on and which classes have the scale adjustment turned off based on the degrees of distortion between the scale-adjusted pixels and the original pixels, that is, the cost. On the basis that pixel classifying is performed on the first reconstructed video unit and the scale factor of each class is determined, each scale factor is used to perform scale adjustment on the pixels of the corresponding class, to calculate the costs corresponding to the pixels of each class. If the performance of pixels of a class has no gain or even deteriorates after being subjected to the scale adjustment, the scale adjustment switch flag can be set to 0 for this class, indicating that no scale adjustment is to be performed for this class; otherwise, the scale adjustment switch flag can be set to 1 for this class, indicating that the scale adjustment is to be performed for this class. On this basis, according to the scale adjustment switch flag, for the class for which scale adjustment is turned on, the corresponding scale factor can be used to perform scale adjustment, thereby improving the flexibility of scale adjustment and picture quality.

In an embodiment, the performing scale adjustment on the first reconstructed video unit according to the scale factor includes: operations 1441, 1443, 1445 and 1447.

In the operation 1441, a first cost of a video unit obtained after pixels of multiple classes are subjected to scale adjustment by using a single scale factor with respect to the original video unit is calculated.

In the operation 1443, a second cost of a video unit obtained after pixels of the multiple classes are subjected to scale adjustment by using scale factors corresponding to the respective classes with respect to the original video unit is calculated.

In the operation 1445, according to the first cost and the second cost, switch statuses of scale adjustment corresponding to the signal scale factor and switch statuses of scale adjustment corresponding to the multiple classes are flagged respectively by using scale adjustment switch flags.

In the operation 1447, according to the scale adjustment switch flags, the single scale factor is used to perform scale adjustment on the pixels of the multiple classes, or scale factors corresponding to classes for which the scale adjustment is turned on are used to perform scale adjustment on pixels of the corresponding classes.

In this embodiment, by setting the scale adjustment switch flag (Flag) for each class and setting the scale adjustment switch flag for a single scale factor, the scale adjustment method can be controlled, and if the scale adjustment is performed for each class separately, it is further possible to control the scale adjustment for each class to be turned on or off.

For example, a single scale factor is determined for the first reconstructed video unit, and then the scale factor for each class is determined based on the result of pixel classification, for example, according to the active factors A in the ALF, the first reconstructed video unit can be divided into N classes, corresponding to N scale factors, plus the single scale factor, there are a total of N+1 scale factors. A single scale factor is used to perform scale adjustment on the first reconstructed video unit, and the first cost is calculated; the above N scale factors are used to perform the scale adjustment on the pixels of the corresponding classes respectively, and the second cost of the first reconstructed video unit after subjected to the scale adjustment with respect to the original video unit is calculated; the first cost is compared with the second cost, and for the scale adjustment manner having a small cost, its scale adjustment switch flag is set to 1, indicating that the scale adjustment is turned on; and for the scale adjustment manner having a large cost, its scale adjustment switch flag is set to 0, indicating that the scale adjustment is turned off. Specifically, when N scale factors are used to perform scale adjustment on the pixels of respective classes respectively, it is also possible to further set the scale adjustment switch flag for each class according to whether the performance of pixels of respective class has gained after the pixels are subjected to the scale adjustment.

The loop filtering method of this embodiment provides the class-based competition decision-making mechanism (for example, competition decision making of scale adjustment between classes, competition decision making of scale adjustment between with a single scale factor and with multiple scale factors, competition decision-making between the scale adjustment of classes and the scale adjustment of fused classes), and class-based scale adjustment switch control strategy, improves the flexibility of scale adjustment, reduces the cost of the scale adjustment, reduces cost of the reconstructed video unit, ensures quality of the reconstructed picture, and improves the loop filtering performance.

In an embodiment of the present application, a video encoding method is further provided, and the video encoding method can be applied to an encoding end. This video encoding method can be implemented based on a hybrid encoding framework, for example, a new-generation video encoding standard H.266/VVC encoding framework developed by a joint video project of the Telecommunications Standards Branch of the International Telecommunication Union ITU-T and the International Organization for Standardization (ISO)/International Electrotechnical Commission (IEC), including modules such as intra-frame prediction, inter-frame prediction, transformation, quantization, loop filtering and entropy encoding.

It is to be noted that the method provided by the embodiments of the present application can be applied to the H.266/VVC standard, the Audio Video coding Standard (such as AVS3) or a next generation video codec standard, which is not limited by the embodiments of the present application.

Figure 4:
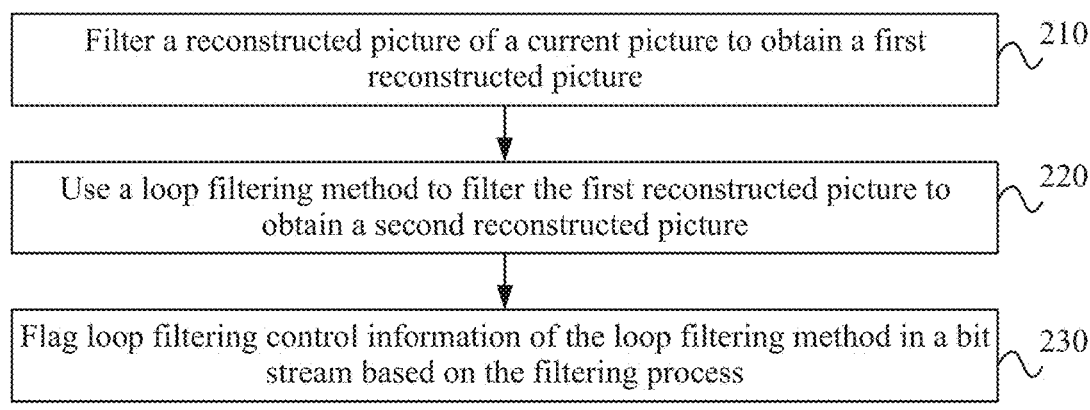
FIG. 4 is a flow chart of a video encoding method according to an embodiment.

FIG. 4 is a flow chart of a video encoding method according to an embodiment. As shown in FIG. 4, the method according to this embodiment includes: operations 210, 220 and 230.

In the operation 210, a reconstructed picture of a current picture is filtered to obtain a first reconstructed picture.

In the operation 220, a loop filtering method is used to filter the first reconstructed picture to obtain a second reconstructed picture.

In the operation 230, loop filtering control information of the loop filtering method is flagged in a bit stream based on the filtering process.

Specifically, the first reconstructed picture includes a first reconstructed video unit, the second reconstructed picture includes a second reconstructed video unit, and the loop filtering method is determined based on the loop filtering method according to any embodiment described above. For example, the loop filtering method is used to filter the first reconstructed picture to obtain the second reconstructed picture, which mainly includes: operations 2301, 2303, 2305 and 2307.

In the operation 2301, a first reconstructed video unit processed by the loop filter is acquired.

In the operation 2303, pixel classification is performed on the first reconstructed video unit.

In the operation 2305, a scale factor corresponding to each class is determined.

In the operation 2307, scale adjustment is performed on the first reconstructed video unit according to the scale factor of each class to obtain a second reconstructed video unit.

Figure 5:
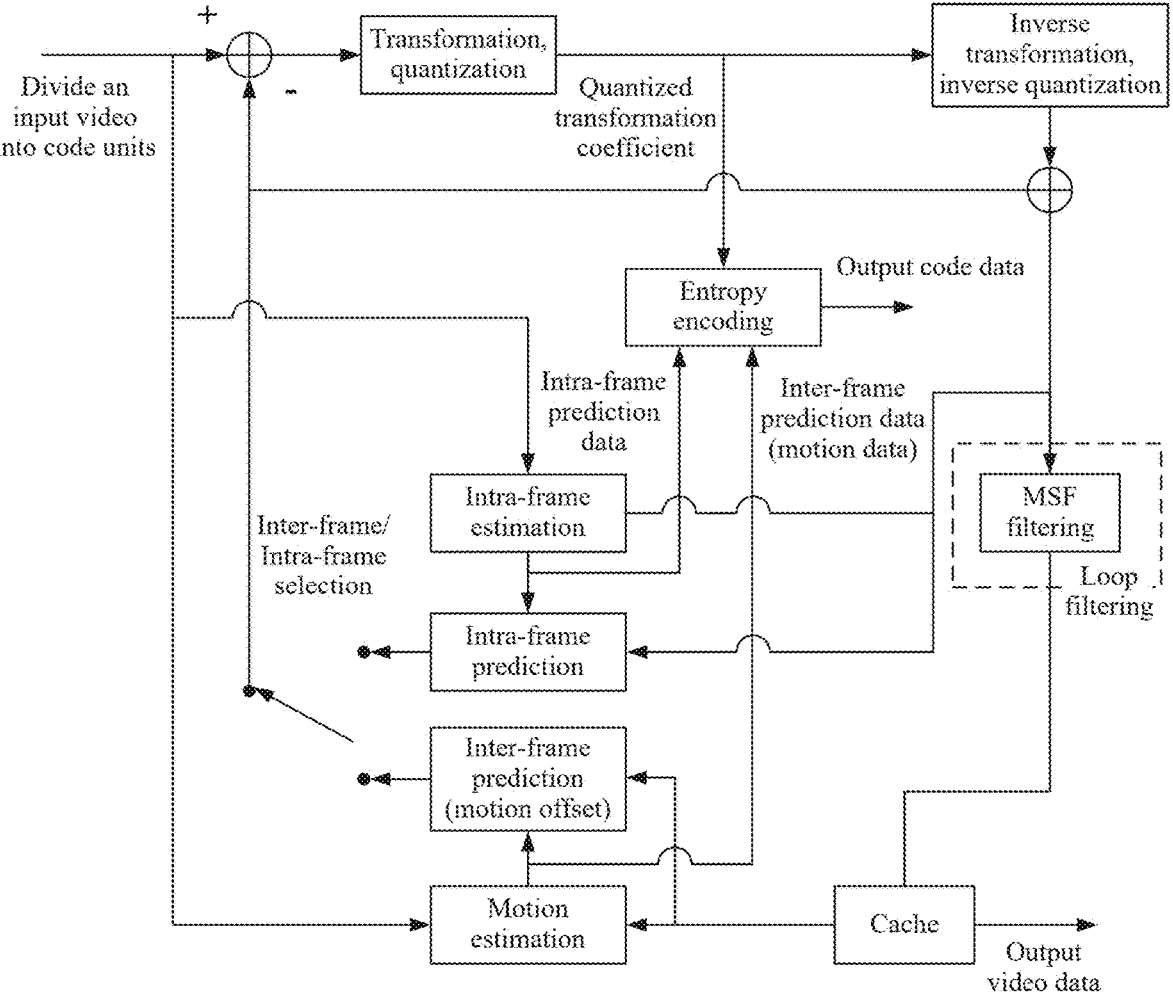
FIG. 5 is a schematic diagram of an encoding end framework according to an embodiment.

FIG. 5 is a schematic diagram of an encoding end framework according to an embodiment. As shown in FIG. 5, the overall framework process of the encoding end is as follows.

(1) A current picture of an input video is divided into code units.

(2) The divided code units are transmitted to the Intra-frame prediction module or Inter-frame prediction module for predictive encoding. The Intra-frame prediction module is mainly used to remove spatial correlation of the picture, and the Inter-frame prediction module is mainly used to remove time correlation of the picture.

(3) The predicted value is subtracted from the original block to obtain a residual value, and then the residual value is transformed and quantized to remove frequency domain correlation and perform lossy compression for the data.

(4) Entropy encoding is performed on all encoding parameters and residual values to form a binary stream for storage or transmission. The output data of the entropy encoding module is just the bit stream of the original video after being compressed.

(5) The predicted value and the residual value after inverse quantization and inverse transformation are added to obtain block reconstructing values to form a reconstructed picture. The reconstructed picture can be processed by filtering (such as LMCS, DBF, SAO, ALF and/or NN), to obtain the first reconstructed picture.

(6) The first reconstructed picture passes through the loop filter to be MSF filtered to obtain a second reconstructed picture, and the second reconstructed picture is stored in the picture cache to serve as a reference picture.

(7) The second reconstructed picture is used to perform video encoding to obtain an encoded video sequence, and in the process of encoding, loop-filtering control information of the loop filtering method is flagged in the bit stream based on the above filtering process.

In an embodiment, in order to reduce the distortion of the reconstructed picture with respect to the original picture, an NN filter and MSF filtering are introduced in the process of loop filtering, which can be added as a new operation or module, or can replace the DBF and SAO in the original filtering process, thus, not only transmission overhead is saved but also picture quality is improved.

The NN filter adopts the form based on deep learning to analyze data and establish a mapping from the distorted picture to the original picture, thereby completing picture quality enhancement. This embodiment performs pixel classification in the process of loop filtering and introduces a scale factor for each class, and can utilize the class-based competition decision-making mechanism and scale adjustment switch control strategy to perform flexible scale adjustment.

Figure 6:
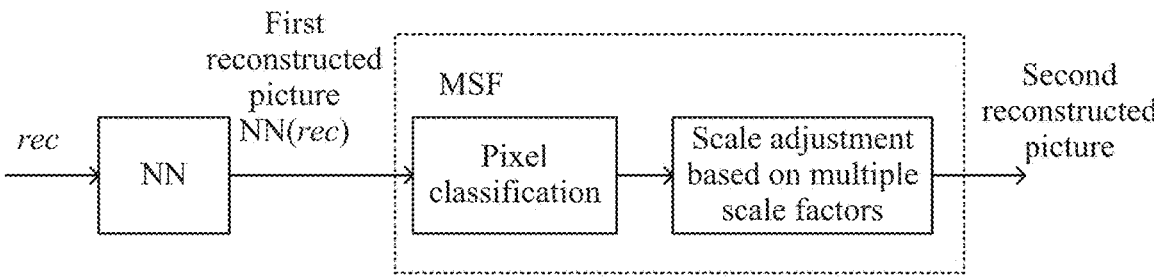
FIG. 6 is a schematic diagram of a video encoding process according to an embodiment.

FIG. 6 is a schematic diagram of a video encoding process according to an embodiment. In this embodiment, for the first reconstructed picture that has been subjected to NN filtering, MSF is applied in the hybrid encoding framework of video encoding. As shown in FIG. 6, the MSF includes two parts: pixel classification and scale adjustment based on multi-scale factors. Multiple ways of filtering are supported in the process of the video encoding. For example, the LMCS can be used to obtain the reconstructed picture, the NN filtering is performed on the reconstructed picture to obtain the first reconstructed picture, and then pixel classification is performed based on the first reconstructed picture (for example, block classification mode of ALF, by calculating the gradient and the directionality factor and/or activity factor, the classes to which the pixel blocks belong are determined), and scale adjustment is performed according to the scale factor of each class (in this process, the competition decision-making mechanism and the scale adjustment switch control strategy can be used), to obtain the second reconstructed picture.

In the video encoding method of this embodiment, loop filtering and scale adjustment based on multiple scale factors are performed on the reconstructed picture, which provides high-quality reconstructed pictures for video encoding and improves the quality of the encoded video. Furthermore, the loop filtering control information of the loop filter method is flagged in the bit stream, thereby providing a basis for using the loop filtering method for decoding.

In an embodiment, after obtaining the second reconstructed picture, the method further includes: operations 2310 and 2313.

In the operation 2310, block classification is performed on the second reconstructed picture.

In the operation 2313, adaptive loop filtering (ALF) is performed on the pixels of each class in the second reconstructed picture.

Figure 7:
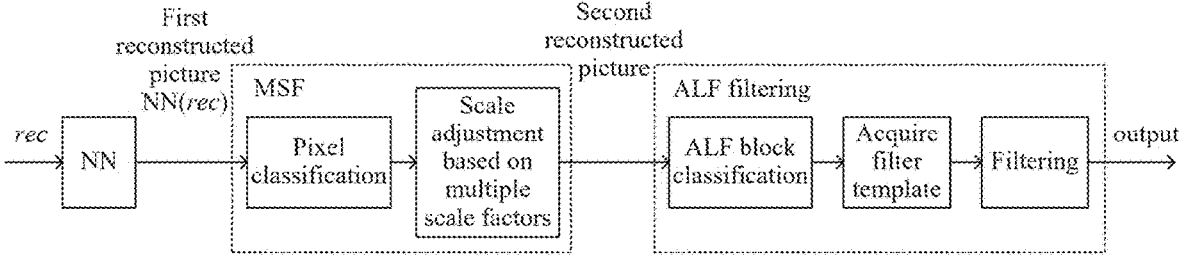
FIG. 7 is a schematic diagram of a video encoding process according to an embodiment.

FIG. 7 is a schematic diagram of a video encoding process according to an embodiment. This embodiment applies MSF to the hybrid encoding framework of video encoding. As shown in FIG. 7, the MSF includes two parts: pixel classification and scale adjustment based on multi-scale factors. Multiple ways of filtering are supported in the process of video encoding. FIG. 7 illustrates by taking NN filtering and ALF filtering as examples. Before performing MSF filtering on the first reconstructed picture in the first reconstructed picture, the method further includes performing NN filtering on the first reconstructed picture; after obtaining the second reconstructed picture, ALF filtering can further be performed on the second reconstructed picture to further improve filtering performance and picture quality. Specifically, pixel classification can refer to the block classification mode of ALF.

Figure 8:
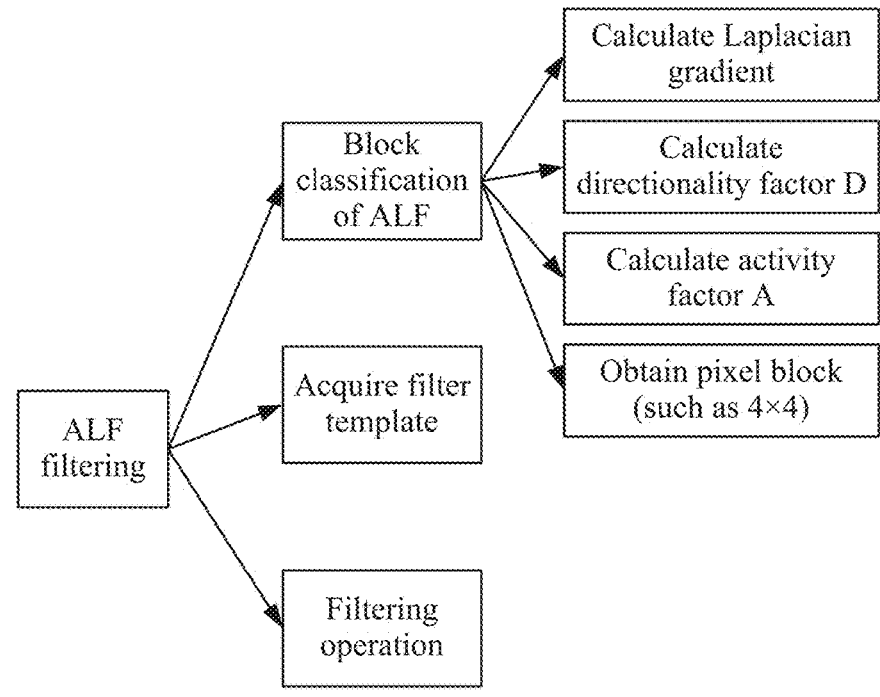
FIG. 8 is a schematic diagram of ALF filtering according to an embodiment.

FIG. 8 is a schematic diagram of ALF filtering according to an embodiment. As shown in FIG. 8, the ALF filtering process mainly includes:

(1) block classification, for example, dividing the second reconstructed picture into 4×4 pixel blocks (or luma blocks);

(2) acquiring filter templates, for the classification results in (1), each class corresponding to a set of filter coefficients, corresponding to four filtering templates, for example, no transformation, diagonal transformation, vertical flip, and rotation transformation, and then determining the filter coefficient adjustment method for each 4×4 pixel block; and (3) determining a 7×7 filtering template (including transformation mode) for each 4×4 luma block, then filtering each pixel in the 4×4 pixel block, and finally outputting a reconstructed picture.

In an embodiment, after obtaining the second reconstructed picture, the method further includes: an operation 2320.

In the operation 2320, an adaptive loop filtering is performed on pixels of each class in the second reconstructed picture based on classification results of pixel classification.

Figure 9:
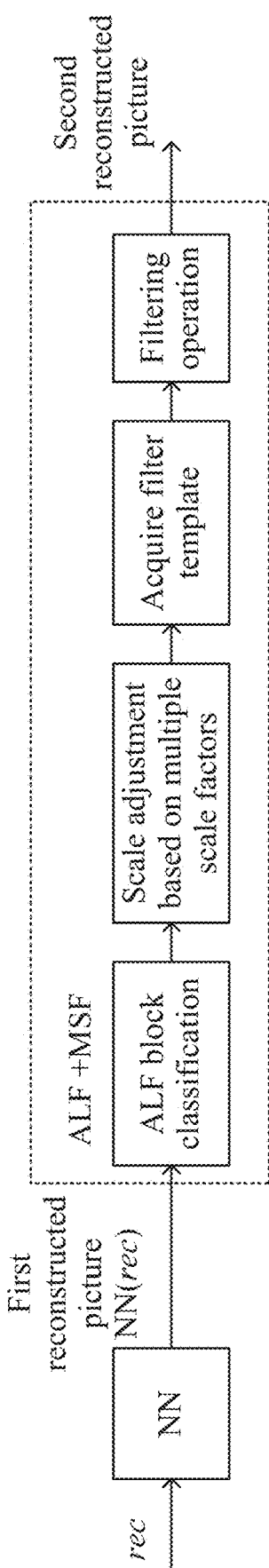
FIG. 9 is a schematic diagram of another video encoding process according to an embodiment.

FIG. 9 is a schematic diagram of another video encoding process according to an embodiment. As shown in FIG. 9, the scale adjustment based on multiple scale factors can be performed on the basis of the block classification of ALF filtering, that is, the pixel classification in the MSF can be achieved by means of of the block classification mode of the ALF filtering. The reconstructed picture after being subjected to the LMCS filtering can be first subjected to the NN filtering, and then according to the classification results of block classification of ALF, the scale adjustment based on multiple scale factors can be performed first, and then the optimal filter usage scheme can be determined by selecting the filter templates to perform the adaptive filtering. On this basis, the classification results can be fully utilized for scale adjustment and adaptive filtering without the need for secondary classification, thus improving encoding efficiency and reducing encoding complexity.

In an embodiment, before the using a loop filtering method to filter the first reconstructed picture, the method further includes: operations 2210 and 2213.

In the operation 2210, block classification is performed on the first reconstructed picture.

In the operation 2213, based on classification results of the block classification, an adaptive loop filtering is performed on pixels of each class in the first reconstructed picture.

Figure 10:
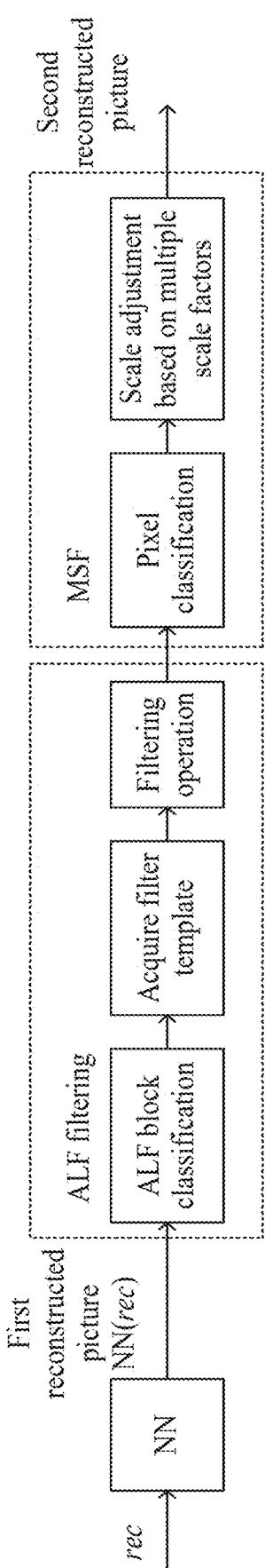
FIG. 10 is a schematic diagram of yet another video encoding process according to an embodiment.

FIG. 10 is a schematic diagram of yet another video encoding process according to an embodiment. Multiple ways of filtering are supported in the process of video encoding. FIG. 10 illustrates by taking NN filtering and ALF filtering as examples. Before performing MSF filtering on the first reconstructed picture in the first reconstructed picture, the method further includes performing the NN filtering and the ALF filtering on the first reconstructed picture, to further improve filtering performance and picture quality. The MSF includes two parts: pixel classification and scale adjustment based on multi-scale factors. Specifically, pixel classification can refer to the block classification mode of ALF. In this embodiment, the scale adjustment based on multiple scale factors is arranged after the ALF filter, so that the gain obtained by the ALF filter, fully ensuring effectiveness of the scale adjustment and improving quality of the reconstructed picture.

In an embodiment, before determining a scale factor corresponding to each class, the method further includes: an operation 2304.

In the operation 2304, based on classification results of pixel classification, an adaptive loop filtering is performed on pixels of each class in the first reconstructed picture.

Figure 11:
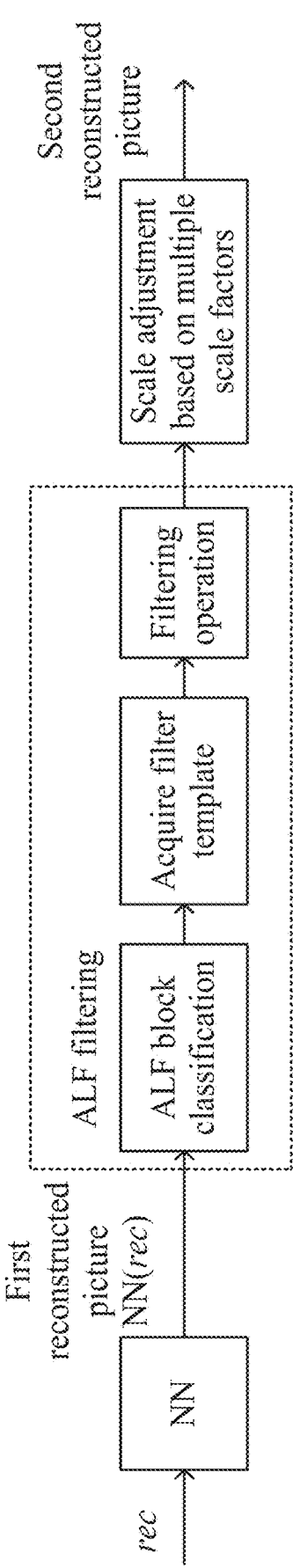
FIG. 11 is a schematic diagram of yet another video encoding process according to an embodiment.

FIG. 11 is a schematic diagram of yet another video encoding process according to an embodiment. As shown in FIG. 11, the scale adjustment based on multiple scale factors can be performed on the basis of the block classification of ALF filtering, that is, the pixel classification in the MSF can be achieved by means of the block classification mode of the ALF filtering. The reconstructed picture after being subjected to the LMCS filtering can be first subjected to the NN filtering, and then according to the classification results of block classification of ALF, the optimal filter usage scheme can be determined first by selecting the filter templates to perform the adaptive filtering, and then the scale adjustment based on multiple scale factors is performed. On this basis, the classification results can be fully utilized for adaptive filtering and scale adjustment without the need for secondary classification, thus improving encoding efficiency and reducing encoding complexity. Moreover, the gain obtained by the scale adjustment will not be covered by the ALF filtering, thus fully ensuring effectiveness of the scale adjustment, and improving quality of the reconstructed picture.

In an embodiment, before the using a loop filtering method to filter the first reconstructed picture, the method further includes: an operation 2220.

In the operation 2220, DBF filtering is performed on the reconstructed picture.

After the obtaining a second reconstructed picture, the method further includes: an operation 2330.

In the operation 2330, SAO filtering is performed on the second reconstructed picture.

Figure 12:
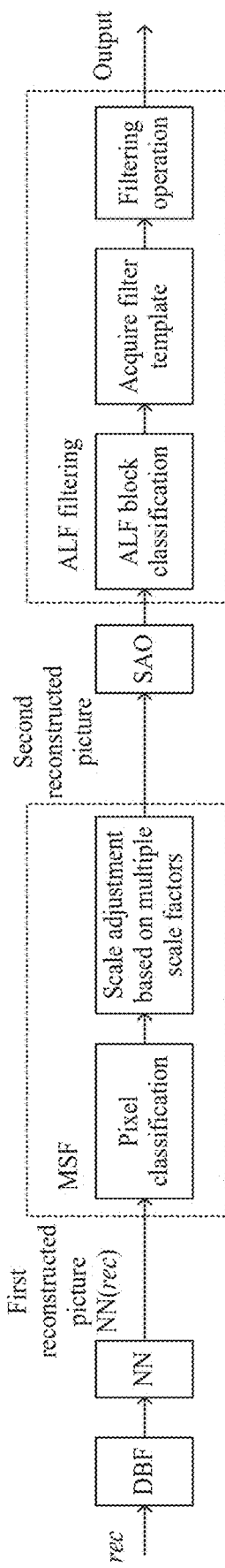
FIG. 12 is a schematic diagram of yet another video encoding process according to an embodiment.

FIG. 12 is a schematic diagram of yet another video encoding process according to an embodiment. In this embodiment, when loop filtering modules such as DBF and/or SAO are turned on, MSF filtering may also be added. As shown in FIG. 12, it is taken as an example that both the DBF and the SAO are turned on, NN filtering can be between the DBF filtering and the SAO filtering:

(1) after a reconstructed picture subjected to LMCS is obtained, DBF filtering is performed first to obtain a first reconstructed picture;

(2) an NN filtering operation is performed on the first reconstructed picture to obtain a first reconstructed picture processed by the loop filter.

(3) MSF filtering, including two parts: pixel classification and scale adjustment based on multiple scale factors, is performed on the first reconstructed picture, specifically, the pixel classification can refer to the block classification mode of ALF;

(4) SAO filtering is performed on the second reconstructed picture after being subjected to the MSF filtering; and (5) ALF filtering is performed on the second reconstructed picture after being subjected to the SAO filtering, and a final reconstructed picture is output.

In an embodiment, before the using a loop filtering method to filter the first reconstructed picture, the method further includes: an operation 2230.

In the operation 2230, DBF filtering and SAO filtering are performed on the reconstructed picture.

Figure 13:
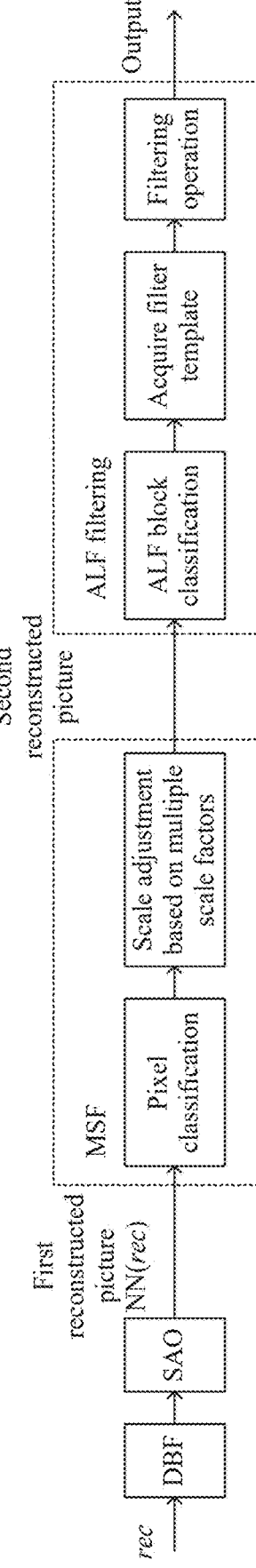
FIG. 13 is a schematic diagram of yet another video encoding process according to an embodiment.

FIG. 13 is a schematic diagram of yet another video encoding process according to an embodiment. In this embodiment, the loop filter may be embodied not as the NN filter, but as a filtering model in related technologies, such as DBF and/or SAO. As shown in FIG. 13, it is taken as an example that both DBF and SAO are turned on:

(1) after the reconstructed picture subjected to LMCS is obtained, the DBF filtering and SAO filtering are performed first to obtain a first reconstructed picture after being subjected to the loop filtering.

(2) MSF filtering including two parts: pixel classification and scale adjustment based on multiple scale factors, is performed on the first reconstructed picture, specifically, the pixel classification can refer to the block classification mode of ALF; and (3) ALF filtering is performed on a second reconstructed picture after being subjected to the MSF filtering, and a final reconstructed picture is output.

In the process of video encoding according to the above embodiment, the loop filtering method can be used in combination with other filtering methods, the order of the filtering methods can be flexibly set, classification can be performed only once, or a secondary classification may also be performed, and the MSF filtering can adopt different classification methods and the scale factor competition strategy and switch control, and provide a high-quality reconstructed picture as a reference for video encoding, thereby ensuring quality of the encoded video.

In this embodiment of the present application, a video decoding method is further provided. Classification-based multi-scale factor adjustment, as a loop filtering method, can also be applied to video decoding.

FIG. 14 is a flow chart of a video decoding method according to an embodiment. As shown in FIG. 14, the method according to this embodiment includes: operations 310, 320 and 330.

In the operation 310, a bit stream containing an encoded video sequence is acquired to obtain loop filtering control information related to a loop filtering method.

In the operation 320, a reconstructed picture of a current picture is filtered to obtain a first reconstructed picture.

In the operation 330, the loop filtering method is used to filter the first reconstructed picture based on the loop filtering control information to obtain a second reconstructed picture.

Specifically, the first reconstructed picture includes a first reconstructed video unit, the second reconstructed picture includes a second reconstructed video unit, and the loop filtering method is determined according to the loop filtering method of any of the above embodiments. For example, the loop filtering method is used to filter the first reconstructed picture to obtain a second reconstructed picture, which mainly includes: operations 3401, 3403, 3405 and 3407.

In the operation 3401, a first reconstructed video unit processed by the loop filter is acquired.

In the operation 3403, pixel classification is performed on the first reconstructed video unit.

In the operation 3405, the scale factor corresponding to each class is determined.

In the operation 3407, scale adjustment is performed on the first reconstructed video unit based on the scale factor of each class, to obtain a second reconstructed video unit.

FIG. 15 is a schematic diagram of a decoding end framework according to an embodiment. The decoding framework also includes modules or operations such as intra-frame prediction, motion offset, inverse transformation, inverse quantization, and context-based adaptive binary arithmetic coding. Specifically, the contents such as types of scale adjustment and modes of pixel classification, scale factors, etc., can be obtained by parsing the high-level syntax of the bitstream. As shown in FIG. 15, the overall framework process of the decoding end is as follows.

(1) Header information decoding is performed on the bit stream of the encoded video sequence, and for the decoding of the context-based adaptive binary arithmetic coding, loop filtering control information related to the loop filtering method is obtained.

(2) A bit stream of the encoded video sequence is decoded to obtain a predicted value and a residual value, an inverse transformation and an inverse quantization are performed on the residual value, and the predicted value is added to the residual value after being subjected to the inverse quantization and inverse transformation to obtain a block reconstructed value to form a reconstructed picture. Furthermore, the spatial correlation or temporal correlation of the picture can be removed through the intra-frame prediction or inter-frame prediction.

(3) After the filtering processes such as LMS, DBF, SAO and/or ALF are performed on the reconstructed picture, a first reconstructed picture is obtained.

(4) Based on the loop filtering control information, the loop filtering method is used to filter the first reconstructed picture. After the first reconstructed picture is filtered by the loop filter, a second reconstructed picture is obtained and stored in the picture cache as a reference.

(5) The second reconstructed picture is used to obtain decoded video data.

In this embodiment, in order to reduce the distortion between the reconstructed picture and the original picture, the NN filter is introduced in the process of loop filtering. It can be added as an additional operation or module, or it can replace the DBF and SAO in the original filtering process, which can not only save transmission overhead, but also improve picture quality. In addition, the loop filtering control information can be read from the bit stream, which provides a reliable basis for video decoding.

It is to be noted that the video decoding method provided in this embodiment is only an implementation method of the classification-based multi-scale factor adjustment, and practical applications also include a variety of optional implementations.

In the video decoding method according to this embodiment, loop filtering and scale adjustment based on multiple scale factors are performed on the reconstructed picture, which provides a high-quality reconstructed picture for video decoding and improves the quality of encoded and decoded data.

In an embodiment, the loop filtering control information includes at least one of a sequence-level filtering switch flag of the encoded video sequence, a filtering picture-level flag and loop filter structure information.

The sequence-level filtering switch flag of the encoded video sequence is configured to indicate whether to turn on or turn off the loop filtering method for the video sequence in which the current picture is located.

The filtering picture-level flag is configured to indicate that the loop filtering control information appears in picture header information or in slice header information.

The loop filter structure information is used to indicate that a loop filtering is performed on a video unit to which the loop filtering is applied.

In this embodiment, in the bit stream of the encoded video sequence, the loop filtering control information related to the MSF filtering can be expressed through high-level syntax, the loop filtering control information includes switches of MSF filtering, the number of classes of pixel classification, scale factors and other information. A decoder performs header information decoding on the input encoded video sequence, and MSF filtering is performed based on the obtained loop filtering control information.

The loop filtering control information includes the sequence-level filtering switch flag. According to the sequence-level filtering switch flag, it can be determined whether the loop filtering is turned on for the current video sequence (whether to perform MSF filtering). The sequence-level filtering switch flag can be expressed in the sequence parameter set (SPS).

Table 1 shows syntax elements of the sequence-level filtering switch flag.

TABLE 1

| Syntax elements of sequence-level filtering switch flags | |
| --- | --- |
| | Descriptor |
| seq_parameter_set_rbsp( ) { | |
| ...... | |
| sps_msf_enabled_flag | u(1) |
| ...... | u(1) |
| } | |

The semantics of the syntax elements in Table 1 are as follows: sps_msf_enabled_flag: equal to 1 means that the current video sequence has loop filtering turned on (MSF turned on), equal to 0 means that the current video sequence does not have loop filtering turned on (MSF turned off).

The loop filtering control information includes a filtering picture-level flag. According to the filtering picture-level flag, the MSF filtering level can be determined, that is, the video unit to which the loop filtering control information is applied, the loop filtering control information can be applied to a reconstructed picture or to one or more slices of a reconstructed picture, filtering picture-level flags are represented in a picture parameter set (PPS).

Table 2 shows the syntax elements of the filtering picture-level flags.

TABLE 2

| Syntax elements for filtering picture-level flags | |
| --- | --- |
| | Descriptor |
| pic_parameter_set_rbsp( ) { | |
| ...... | |
| pps_msf_info_in_ph_flag | u(1) |
| ...... | |
| } | |

The semantics of the syntax elements in Table 2 are as follows: pps_msf_info_in_ph_flag: equal to 1 indicates that the loop filtering control information appears in the picture header information, equal to 0 indicates that the loop filtering control information does not appear in the picture header information, and can appear in the slice header information.

For picture header information, when pps_msf_info_in_ph_flag is equal to 1, it means that the loop filtering control information appears in the picture header information. According to the picture header information, the number of scale factors or classes, the switch flag corresponding to each class, and the scale factor of each class and other information can be obtained.

Table 3 shows the syntax elements of the picture header information.

TABLE 3

| Syntax elements of picture header information | |
| --- | --- |
| | Descriptor |
| picture_header_structure( ) { | |
| ...... | |
| if( sps_msf_enabled_flag && pps_msf_info_in_ph_flag ) { | |
| msf_structure | |
| } | |
| ...... | |
| } | |

For the slice header information, when pps_msf_info_in_ph_flag is equal to 0, it means that the loop filtering control information does not appear in the picture header information, but appears in the slice header information. Information such as the number of scale factors or classes, the switch flag corresponding to each class, and the scale factor of each class can be obtained according to the filtering picture-level flags.

When pps_msf_info_in_ph_flag is equal to 0, it means that MSF related information does not appear in the picture header information, but can appear in the slice header information. Information such as the number of scale factors or classes, the switch flag corresponding to each class, and the scale factor of each class can be obtained according to the slice header information.

Table 4 shows the syntax elements of the slice header information.

TABLE 4

| Syntax elements of slice header information | |
| --- | --- |
| | Descriptor |
| slice_header( ) { | |
| ...... | u(1) |
| if( sps_msf_enabled_flag && !pps_msf_info_in_ph_flag ) { | |
| msf_structure ( ) | |
| } | |
| ...... | |
| } | |

In an embodiment, video units include pictures or video slices in a video.

In an embodiment, the loop filter structure information includes at least one of a video unit filtering switch flag, a video unit component switch flag, the number of video unit classes, a video unit class filtering switch flag or a video unit scale factor.

The video unit filtering switch flag is configured to indicate that a video unit has the loop filtering method turned on or turned off.

The video unit component switch flag is configured to indicate a video unit component to which the loop filtering is applied.

The number of video unit classes is configured to indicate the total number of classes for the video unit pixel classification.

The video unit class filtering switch flag is configured to indicate that classes in the video unit have the loop filtering method turned on or turned off.

The video unit scale factor is configured to indicate a scale factor corresponding to the video unit or corresponding to a class in the video unit.

Specifically, the video unit component includes at least one of the following:

a luma component of a video unit;

a first chroma component of a video unit; and a second chroma component of a video unit.

In this embodiment, loop filtering (or MSF filtering) switch of the current picture or slice, the number of classes, the scale factor of each class and other information can be obtained according to the loop filter structure information, and the scale adjustment is performed for classes based on the information.

Table 5 shows the syntax elements that perform scale adjustment on a single class according to the loop filter structure information.

TABLE 5

| Syntax elements that perform scale adjustment on a single class based on loop filter structure information | |
| --- | --- |
| | Descriptor |
| msf_structure( ) { | |
|   msf_enabled_flag | u(1) |
|   if( msf_enabled_flag ) | |
|     msf_scale | u(9) |
| } | |

The semantics of the syntax elements in Table 5 are as follows:

msf_enabled_flag: equal to 1 indicates that loop filtering (or MSF filtering) is turned on, equal to 0 indicates that loop filtering (or MSF filtering) is not turned on, and when this syntax element does not exist, it means that msf_enabled_flag is equal to 0.

msf_scale: represents a numerical value of the scale factor.

Table 6 shows syntax elements that implement scale adjustment for multiple classes based on loop filter structure information.

TABLE 6

| Syntax elements that implement scale adjustment for multiple classes based on loop filter structure information | |
| --- | --- |
| | Descriptor |
| msf_structure( ) { | |
|   msf_enabled_flag | u(1) |
|   if( msf_enabled_flag ) { | |
|     num_msf_class | u(5) |
|     for( i = 0; i < num_msf_class; i++ ) | |
|       msf_scale [ i ] | u(9) |
|   } | |
| } | |

The semantics of the syntax elements in Table 6 are as follows.

msf_enabled_flag: equal to 1 indicates that loop filtering (or MSF filtering) is turned on, equal to 0 indicates that loop filtering (or MSF filtering) is not turned on, and when this syntax element does not exist, it means that msf_enabled_flag is equal to 0.

num_msf_class: when msf_structure( ) is located in the picture header information, num_msf_class means the number of classes of the current picture. When msf_structure( ) is located in the slice header information, num_msf_class means the number of classes of the current slice.

msf_scale [i] indicates the scale factor value of the $i^{th}$ class.

Table 7 shows syntax elements for performing scale adjustment on luma components and chroma components of multiple classes respectively according to the loop filter structure information.

TABLE 7

| Syntax elements for performing scale adjustment on luma components and chroma components of multiple classes respectively according to loop filter structure information | |
| --- | --- |
| | Descriptor |
| msf_structure( ) { | |
|   msf_enabled_flag | u(1) |
|   if( msf_enabled_flag ) { | |

TABLE 7-continued

| Syntax elements for performing scale adjustment on luma components and chroma components of multiple classes respectively according to loop filter structure information | |
| --- | --- |
| | Descriptor |
|   num_msf_class _luma | u(5) |
|   for( i = 0; i < num_msf_class _luma; i++ ) | |
|     msf_scale_luma[ i ] | u(9) |
|   if( sps_chroma_format_idc != 0 ) { | |
|     msf_cb_enabled_flag | u(1) |
|     msf_cr_enabled_flag | u(1) |
|   } | |
|   if( msf_cb_enabled_flag \|\| msf_cr_enabled_ flag ) | |
|     num_msf_class _chroma | u(3) |
|     for( i = 0; i < num_msf_class _ chroma; i++ ) { | |
|       msf_scale_ Cb[ i ] | u(9) |
|       msf_scale_ Cr[ i ] | u(9) |
|     } | |
|   } | |
| } | |

The semantics of the syntax elements in Table 7 are as follows:

msf_enabled_flag: equal to 1 indicates using loop filtering (or MSF filtering), equal to 0 indicates not using loop filtering (or MSF filtering), and when this syntax element does not exist, it means that msf_enabled_flag is equal to 0.

num_msf_class_luma: when msf_structure( ) is located in the picture header information, num_msf_class_luma represents the number of luma classes of the current picture MSF. When msf_structure( ) is located in the slice header information, num_msf_class_luma represents the number of luma classes of the current slice MSF.

msf_scale_luma[i]: indicates the scale factor value of the $i^{th}$ luma class.

msf_cb_enabled_flag: equal to 1 indicates that chroma Cb uses loop filtering (or MSF filtering), equal to 0 indicates that that chroma Cb does not use loop filtering (or MSF filtering). When this syntax element does not exist, it means that msf_cb_enabled_flag is equal to 0.

msf_cr_enabled_flag: equal to 1 indicates that chroma Cr uses loop filtering (or MSF filtering), equal to 0 indicates that chroma Cr does not use loop filtering (or MSF filtering). When this syntax element does not exist, it means that msf_cr_enabled_flag is equal to 0.

num_msf_class_chroma: when msf_structure( ) is located in the picture header information, num_msf_class_luma represents the number of chroma classes of the current picture MSF. When msf_structure( ) is located in the slice header information, num_msf_class_luma represents the number of chroma classes of the current slice MSF.

msf_scale_Cb[i]: indicates the scale factor value of the $i^{th}$ class of chroma Cb.

msf_scale_Cr[i]: indicates the scale factor value of the $i^{th}$ class of chroma Cr.

Table 8 shows the syntax elements for performing scale adjustment on the luma components and chroma components of some classes respectively according to the loop filter structure information.

TABLE 8

Syntax elements for performing scale adjustment on luma components and chroma components of some classes respectively according to loop filter structure information.

| | Descriptor |
|---|---|
| msf_structure( ) { | |
|   msf_enabled_flag | u(1) |
|   if( msf_enabled_flag ) { | |
|     num_msf_class _luma | u(5) |
|     for( i = 0; i < num_msf_class _luma; i++ ) { | |
|       msf_class_enabled_flag _luma[ i ] | u(1) |
|       if(msf_class _enabled_flag _luma) | |
|         msf_scale_luma[ i ] | u(9) |
|     } | |
|     if( sps_chroma_format_idc != 0 ) { | |
|       msf_cb_enabled_flag | u(1) |
|       msf_cr_enabled_flag | u(1) |
|     } | |
|     if(msf_cb_enabled_flag ‖ msf_cr_enabled_flag ) | |
|       num_msf_class _chroma | u(3) |
|     for( i = 0; i < num_msf_class _chroma; i++ ) { | |
|       msf_class _enabled_flag _chroma[ i ] | u(1) |
|       if(msf_class _ enabled_flag _chroma){ | |
|         msf_scale_Cb[ i ] | u(9) |
|         msf_scale_Cr[ i ] | u(9) |
|       } | |
|     } | |
|   } | |
| } | | msf_enabled_flag: equal to 1 indicates using loop filtering (or MSF filtering), equal to 0 indicates not using loop filtering (or MSF filtering), and when this syntax element does not exist, it means msf_enabled_flag is equal to 0.

num_msf_class_luma: when msf_structure( ) is located in the picture header information, num_msf_class_luma represents the number of luma classes of the current picture MSF, and when msf_structure( ) is located in the slice header information, num_msf_class_luma represents the number of luma classes of the current slice MSF.

msf_class_enabled_flag_luma[i]: equal to 1 means that the $i^{th}$ luma class uses loop filtering (or MSF filtering), equal to 0 means that the $i^{th}$ luma class does not use loop filtering (or MSF filtering).

msf_scale_luma[i]: indicates the scale factor value of the $i^{th}$ luma class.

msf_cb_enabled_flag: equal to 1 indicates that chroma Cb uses MSF, equal to 0 indicates that chroma Cb does not use MSF, and when this syntax element does not exist, it means msf_cb_enabled_flag is equal to 0.

msf_cr_enabled_flag: equal to 1 indicates that chroma Cr uses MSF, and equal to 0 indicates that chroma Cr does not use MSF, and when this syntax element does not exist, it means msf_cr_enabled_flag is equal to 0.

num_msf_class_chroma: represents the number of chroma classes of the current picture MSF.

msf_class_enabled_flag_chroma[i]: when msf_structure ( ) is located in the picture header information, num_msf_class_luma represents the number of chroma classes of the current picture MSF, and when msf_structure ( ) is located in the slice header information, num_msf_class_luma represents the number of chroma classes of the current slice MSF.

msf_scale_Cb[i]: indicates the scale factor value of the $i^{th}$ class of chroma Cb.

msf_scale_Cr[i]: indicates the scale factor value of the $i^{th}$ class of chroma Cr.

In an embodiment, the using a loop filtering method to filter the video unit to which loop filtering is applied based on the loop filtering control information, includes: operations 3410, 3413 and 3415.

In the operation 3410, a video unit for which the loop filtering method is turned on is identified according to the video unit filtering switch flag.

In the operation 3413, a video unit component to which the loop filtering is applied and a class for which the loop filtering method is turned on in the video unit are identified according to the video unit component switch flag and the video unit class filtering switch flag.

In the operation 3415, scale adjustment is implemented on the video unit component of a class for which the loop filtering method is turned on by using the loop filtering method according to the video unit scale factor.

In this embodiment, based on the loop filtering control information, for the video unit having the loop filtering method turned on, scale adjustment can be performed by using the MSF filtering on the video unit component (such as the luma component, Cr and/or Cb) applying the loop filtering of pixels of classes for which the loop filtering method is turned on.

In an embodiment, after the obtaining a second reconstructed picture, the method further includes: an operation 3420.

In the operation 3420, based on classification results of pixel classification, adaptive loop filtering is performed on pixels of each class in the second reconstructed picture.

In this embodiment, the reconstructed picture subjected to the LMCS filtering can be subjected to the NN filtering first, and then based on the classification results of pixel classification (reference may be made to the block classification mode of ALF), it can first perform the scale adjustment based on the multiple scale factors, and then through selecting the filter templates, determine an optimal filter usage scheme, and perform adaptive filtering, reference may be made to FIG. 9. On this basis, the classification results can be fully utilized for scale adjustment and adaptive filtering without the need for secondary classification, thereby improving encoding efficiency and reducing encoding complexity.

In an embodiment, before the using a loop filtering method to filter the first reconstructed picture based on the loop filtering control information, the method further includes: operations 3310 and 3313.

In the operation 3310, block classification is performed on the first reconstructed video unit.

In the operation 3313, based on classification results of the block classification, adaptive loop filtering is performed on pixels of each class in the first reconstructed picture.

In this embodiment, before the MSF filtering is performed on the first reconstructed picture, NN filtering and ALF filtering can also be performed on the first reconstructed picture to further improve filtering performance and picture quality, reference may be made to FIG. 10. The MSF includes two parts: pixel classification and scale adjustment based on multiple scale factors. Specifically, for the pixel classification, reference may be made to the block classification mode of ALF. In this embodiment, the scale adjustment based on multiple scale factors is arranged after the ALF filtering, so that the gain obtained from the scale adjustment will not be covered by the ALF filtering, thereby fully ensuring effectiveness of the scale adjustment and improving quality of the reconstructed picture.

In an embodiment, before determining a scale factor corresponding to each class, the method further includes: an operation 3404.

In the operation 3404, adaptive loop filtering is performed on pixels of each class in the video unit based on classification results of pixel classification.

In this embodiment, the reconstructed picture subjected to the LMCS filtering can be subjected to the NN filtering first, and then based on the classification results of pixel classification (reference may be made to the block classification mode of ALF), it can first select the filter templates to determine an optimal filter usage scheme first, to perform adaptive filtering, and then perform the scale adjustment based on the multiple scale factors, reference may be made to FIG. 11. On this basis, the classification results can be fully utilized for scale adjustment and adaptive filtering without the need for secondary classification; thereby may ensure the effectiveness of gain of the scale adjustment.

In an embodiment, before the using a loop filtering method to filter the first reconstructed picture based on the loop filtering control information to obtain a second reconstructed picture, the method further includes: an operation 3320.

In the operation 3320: DBF filtering is performed on the reconstructed picture.

After obtaining a second reconstructed picture, the method further includes an operation 3430.

In the operation 3430, SAO filtering is performed on the reconstructed picture after being decoded.

In this embodiment, when loop filtering modules such as DBF and/or SAO are turned on, MSF filtering may also be added. Reference may be made to FIG. 12 for the loop filtering process.

In an embodiment, before the using a loop filtering method to filter the first reconstructed picture based on the loop filtering control information, the method further includes: an operation 3330.

In the operation 3330: DBF filtering and SAO filtering are performed on the reconstructed picture.

In this embodiment, the loop filter may not be embodied as the NN filter, but as a filter in related technologies. Reference may be made to FIG. 13 for the loop filtering process.

In the video decoding process of the above embodiment, the loop filtering method can be used in combination with other filtering methods, the order of the filtering methods can be flexibly set, classification can be performed only once, or twice, and MSF filtering can adopt different classification methods and the scale factor competition strategy and switch control, to thereby providing high-quality reconstructed picture as the reference of the video decoding, ensuring the quality of the decoded video data.

Figure 16:
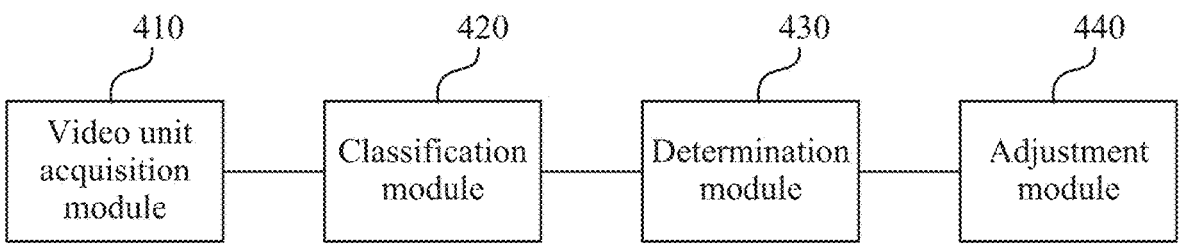
FIG. 16 is a schematic structural diagram of a loop filtering apparatus according to an embodiment.

A loop filtering apparatus is further provided according to an embodiment of the present application. FIG. 16 is a schematic structural diagram of a loop filtering apparatus according to an embodiment. As shown in FIG. 16, the loop filtering apparatus includes: a video unit acquisition module 410, a classification module 420, a determination module 430 and an adjustment module 440.

The video unit acquisition module 410 is configured to acquire a first reconstructed video unit processed by a loop filter.

The classification module 420 is configured to perform pixel classification on the first reconstructed video unit.

The determination module 430 is configured to determine a scale factor corresponding to each class.

The adjustment module 440 is configured to perform scale adjustment on the first reconstructed video unit according to the scale factor, to obtain a second reconstructed video unit.

With the loop filtering apparatus of this embodiment, the second reconstructed video unit is obtained by performing scale adjustment on the first reconstructed video unit according to the classes, thereby, the deviations of the reconstructed values in the second reconstructed video unit with respect to the original values are smaller, and the second reconstructed video unit has less distortion, a higher picture quality and a better filtering effect.

In an embodiment, the loop filter includes a neural network-based loop filter.

In an embodiment, the reconstructed video unit includes a reconstructed picture, or slice, or code block, or code tree block.

In an embodiment, the adjustment module 440 is configured to do at least one of the following:

perform scale adjustment on a luma component of the first reconstructed video unit according to the scale factor;

perform scale adjustment on a first chroma component of the first reconstructed video unit according to the scale factor; and perform scale adjustment on a second chroma component of the first reconstructed video unit according to the scale factor.

In an embodiment, the determination module 430 includes: an integration unit and a fitting unit.

The integration unit is configured to integrate pixels of the same class into the same coordinate diagram, specifically, a horizontal ordinate of each pixel is an output of the respective pixel after passing through the loop filter, and a vertical ordinate of each pixel is an input of the respective pixel before passing through the loop filter.

The fitting unit is configured to fit the pixels in the coordinate diagram based on the least squares method to obtain a straight line, and a slope of the straight line is taken as the scale factor corresponding to the respective class.

In an embodiment, the determination module 430 is configured to determine the scale factor corresponding to each class by reading loop filtering control information related to the loop filtering method.

In an embodiment, the adjustment module 440 is configured to: for each pixel in each class, multiply a difference between the output of the respective pixel after passing through the loop filter and the input of the respective pixel before passing through the loop filter with the scale factor corresponding to the respective class, and add the multiplication result to the input of the respective pixel before passing through the loop filter to obtain an adjusted pixel value of the respective pixel.

In an embodiment, the pixel classification method includes at least one of the following:

performing pixel classification based on luma components;

performing pixel classification based on first chroma components;

performing pixel classification based on second chroma components;

performing pixel classification based on block classification modes;

performing pixel classification based on pixel regions;

performing pixel classification based on classes of neural network-based loop filters;

performing pixel classification based on classification modes used by de-blocking filtering;

performing pixel classification based on classification modes used by SAO filtering; or performing pixel classification by neural networks for pixel classification.

In an embodiment, pixel classification based on block classification modes, includes as follows.

Pixel blocks of the first reconstructed video unit are acquired.

A Laplacian gradient of each of the pixel blocks is calculated, and a directionality factor and an activity factor are calculated based on the Laplacian gradient.

A class of the respective pixel block is determined based on at least one of the directionality factor and the activity factor, and classes of all pixels in the reconstructed video unit are determined.

In an embodiment, the adjustment module 440 includes: a first calculation unit and a first adjustment unit.

The first calculation unit is configured to calculate, for pixels of each class, costs of pixels after being subjected to the scale adjustment by using a scale factor corresponding to the respective class with respect to the original pixels.

The first adjustment unit is configured to use, according to costs corresponding to pixels of multiple classes, scale factors corresponding to part of classes of the multiple classes to perform scale adjustment on the pixels of the corresponding classes.

In an embodiment, the adjustment module 440 includes: a second calculation unit, a third calculation unit and a second adjustment unit.

The second calculation unit is configured to calculate a first cost of a picture obtained after pixels of classes are subjected to scale adjustment by using a single scale factor with respect to the original picture.

The third calculation unit is configured to calculate a second cost of a picture obtained after pixels of classes are subjected to scale adjustment by using scale factors corresponding to the respective classes with respect to the original picture.

The second adjustment unit is configured to, according to the first cost and the second cost, perform scale adjustment on the first reconstructed video unit by using the single scale factor, or perform scale adjustment on the pixels of the classes by using the scale factors corresponding to the respective classes respectively.

In an embodiment, the single scale factor is a value set according to statistical information; or, the single scale factor is determined based on a slope of a straight line obtained by fitting each pixel in the first reconstructed video unit.

In an embodiment, the adjustment module 440 includes a fourth calculation unit, a fusion unit, a determination unit, a fifth calculation unit and a third adjustment unit.

The fourth calculation unit is configured to calculate a second cost of a video unit obtained after pixels of classes are subjected to scale adjustment by using scale factors corresponding to the respective classes with respect to the original video unit.

The fusion unit is configured to fuse classes whose corresponding scale factor differences within a set range into one class.

The determination unit is configured to determine a scale factor corresponding to each fused class.

The fifth calculation unit is configured to calculate a third cost of a video unit obtained after pixels of fused classes are subjected to scale adjustment by using scale factors corresponding to the respective fused classes with respect to the original video unit.

The third adjustment unit is configured to, according to the second cost and the third cost, perform scale adjustment on the pixels of the multiple classes by using the scale factors corresponding to the respective classes respectively, or perform scale adjustment on the pixels of the multiple fused classes by using the scale factors corresponding to the respective fused classes respectively.

In an embodiment, the adjustment module 440 includes: a sixth calculation unit, a first flagging unit and a fourth adjustment unit.

The sixth calculation unit is configured to, for pixels of each class, calculate costs of pixels after being subjected to scale adjustment by using the scale factor corresponding to the respective class with respect to the original pixels.

The first flagging unit is configured to, according to costs corresponding to the pixels of multiple classes, flag switch statuses of scale adjustment corresponding to the multiple classes respectively by using scale adjustment switch flags.

The fourth adjustment unit is configured to, according to the scale adjustment switch flags, use scale factors corresponding to classes for which the scale adjustment is turned on to perform scale adjustment on pixels of the respective classes.

In an embodiment, the adjustment module 440 includes: a seventh calculation unit, an eighth calculation unit, a second flagging unit and a fifth adjustment unit.

The seventh calculation unit is configured to calculate a first cost of a video unit obtained after pixels of multiple classes are subjected to scale adjustment by using a single scale factor with respect to the original video unit.

The eighth calculation unit is configured to calculate a second cost of a video unit obtained after pixels of the multiple classes are subjected to scale adjustment by using scale factors corresponding to the respective classes with respect to the original video unit.

The second flagging unit is configured to, according to the first cost and the second cost, flag switch statuses of scale adjustment corresponding to the signal scale factor and switch statuses of scale adjustment corresponding to the multiple classes respectively by using scale adjustment switch flags.

The fifth adjustment unit is configured to, according to the scale adjustment switch flags, use the single scale factor to perform scale adjustment on the pixels of the multiple classes, or use scale factors corresponding to classes for which the scale adjustment is turned on to perform scale adjustment on pixels of the corresponding classes.

The loop filtering apparatus proposed in this embodiment and the loop filtering method proposed in the above embodiment pertain to the same inventive concept. Reference can be made to any of the above embodiments for technical details that are not described in detail in this embodiment, and this embodiment can achieve the same beneficial effect as that can be achieved by performing the loop filtering method.

Figure 17:
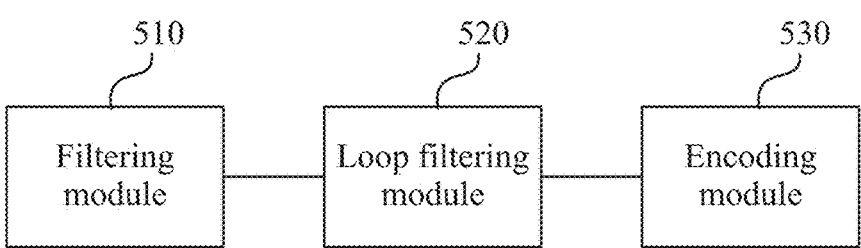
FIG. 17 is a schematic structural diagram of a video encoding apparatus according to an embodiment.

A video encoding apparatus is further provided according to an embodiment of the present application. FIG. 17 is a schematic structural diagram of a video encoding apparatus according to an embodiment. As shown in FIG. 17, the video encoding apparatus includes: a filtering module 510, a loop filtering module 520 and an encoding module 530.

The filtering module 510 is configured to filter a reconstructed picture of a current picture to obtain a first reconstructed picture.

The loop filtering module 520 is configured to use a loop filtering method to filter the first reconstructed picture to obtain a second reconstructed picture.

The encoding module 530 is configured to flag loop filtering control information of the loop filtering method in a bit stream based on the filtering process.

Specifically, the first reconstructed picture includes a first reconstructed video unit, the second reconstructed picture includes a second reconstructed video unit, and the loop filtering method is determined based on the loop filtering method according to any embodiment described above.

The video encoding apparatus of this embodiment performs loop filtering and scale adjustment based on multiple scale factors on the reconstructed picture, which provides high-quality reconstructed pictures for video encoding and improves the quality of the encoded video. In addition, the loop filtering control information of the loop filter method is flagged in the bit stream, thereby providing a basis for using the loop filtering for video decoding.

In an embodiment, the apparatus further includes: a first block classification module; and a first ALF module.

The first block classification module is configured to perform block classification on the second reconstructed picture after the second reconstructed picture is obtained.

The first ALF module is configured to perform adaptive loop filtering on pixels of each class in the second reconstructed picture.

In an embodiment, the apparatus further includes: a second ALF module.

The second ALF module is configured to, after obtaining the second reconstructed picture, perform adaptive loop filtering on pixels of each class in the second reconstructed picture based on classification results of pixel classification.

In an embodiment, the apparatus further includes: a second block classification module and a third ALF module.

The second block classification module is configured to perform block classification on the first reconstructed picture before a loop filtering method is used to filter the first reconstructed picture.

The third ALF module is configured to perform an adaptive loop filtering on pixels of each class in the first reconstructed picture based on classification results of the block classification.

In an embodiment, the apparatus further includes a fourth ALF module.

The fourth ALF module is configured to, before a scale factor corresponding to each class is determined, perform an adaptive loop filtering on pixels of each class in the first reconstructed picture based on classification results of pixel classification.

In an embodiment, the apparatus further includes: a DBF module and an SAO module.

The DBF module is configured to perform DBF filtering on the reconstructed picture before a loop filtering method is used to filter the first reconstructed picture;

The SAO module is configured to, after obtaining a second reconstructed picture, perform SAO filtering on the second reconstructed picture.

In an embodiment, the apparatus further includes: a dual filtering module.

The dual filtering module is configured to perform DBF filtering and SAO filtering on the reconstructed picture before a loop filtering method is used to filter the first reconstructed picture.

The video encoding apparatus proposed in this embodiment and the video encoding method proposed in the above embodiment pertain to the same inventive concept. For technical details not described in detail in this embodiment, reference can be made to any of the above embodiments, and this embodiment can achieve the same beneficial effects as those can be achieved through performing the video encoding method.

Figure 18:
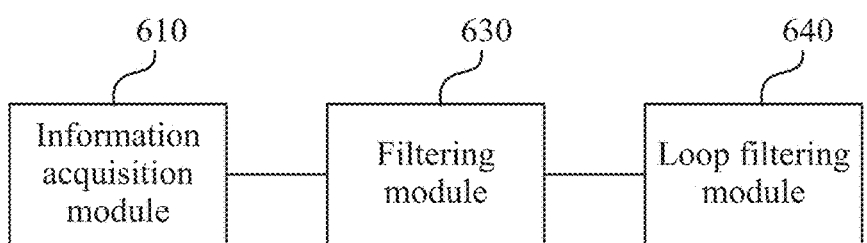
FIG. 18 is a schematic structural diagram of a video decoding apparatus according to an embodiment.

A video decoding apparatus is further provided according to an embodiment of the present application. FIG. 18 is a schematic structural diagram of a video decoding apparatus according to an embodiment. As shown in FIG. 18, the video decoding apparatus includes: an information acquisition module 610, a filtering module 620 and a loop filtering module 630.

The information acquisition module 610 is configured to acquire a bit stream containing an encoded video sequence to obtain loop filtering control information related to a loop filtering method.

The filtering module 620 is configured to filter a reconstructed picture of a current picture to obtain a first reconstructed picture.

The loop filtering module 630 is configured to use the loop filtering method to filter the first reconstructed picture based on the loop filtering control information to obtain a second reconstructed picture.

Specifically, the first reconstructed picture includes a first reconstructed video unit, the second reconstructed picture includes a second reconstructed video unit, and the loop filtering method is determined according to the loop filtering method of any of the above embodiments.

In the video decoding apparatus according to this embodiment, loop filtering and scale adjustment based on multiple scale factors are performed on the reconstructed picture, which provides a high-quality reconstructed picture for video decoding and improves the quality of decoded video data. In addition, the loop filtering control information can be read from the bit stream, thereby providing a reliable basis for video decoding.

In an embodiment, the loop filtering control information includes at least one of a sequence-level filtering switch flag of the encoded video sequence, a filtering picture-level flag and loop filter structure information.

The sequence-level filtering switch flag of the encoded video sequence is configured to indicate whether to turn on or turn off the loop filtering method for the video sequence in which the current picture is located.

The filtering picture-level flag is configured to indicate that the loop filtering control information appears in picture header information or in slice header information.

The loop filter structure information is used to indicate that a loop filtering is performed on a video unit to which the loop filtering is applied.

In an embodiment, video units include pictures or video slices in a video.

In an embodiment, the loop filter structure information includes at least one of a video unit filtering switch flag, a video unit component switch flag, the number of video unit classes, a video unit class filtering switch flag and a video unit scale factor.

The video unit filtering switch flag is configured to indicate that a video unit has the loop filtering method turned on or turned off.

The video unit component switch flag is configured to indicate a video unit component to which the loop filtering is applied.

The number of video unit classes is configured to indicate the total number of classes for the video unit pixel classification.

The video unit class filtering switch flag is configured to indicate that classes in the video unit have the loop filtering method turned on or turned off.

The video unit scale factor is configured to indicate a scale factor corresponding to the video unit or corresponding to a class in the video unit.

Specifically, the video unit component includes at least one of the following:

a luma component of a video unit;

a first chroma component of a video unit; and a second chroma component of a video unit.

In an embodiment, a loop filter module 640 includes: a first identification unit, a second identification unit and an adjustment unit.

The first identification unit is configured to identify a video unit for which the loop filtering method is turned on according to the video unit filtering switch flag.

The second identification unit is configured to identify a video unit component to which the loop filtering is applied and a class for which the loop filtering method is turned on in the video unit according to the video unit component switch flag and the video unit class filtering switch flag.

The adjustment unit is configured to implement scale adjustment on the video unit component of a class for which the loop filtering method is turned on by using the loop filtering method according to the video unit scale factor.

In an embodiment, the apparatus further includes: a fifth ALF module.

The fifth ALF module is configured to, after the second reconstructed picture is obtained, perform adaptive loop filtering on pixels of each class in the second reconstructed picture based on classification results of pixel classification.

In an embodiment, the apparatus further includes: a second block classification module and a sixth ALF module.

The second block classification module is configured to, before the using a loop filtering method to filter the first reconstructed picture based on the loop filtering control information, perform block classification on the first reconstructed video unit.

The sixth ALF module is configured to perform, based on classification results of the block classification, adaptive loop filtering on pixels of each class in the first reconstructed picture.

In an embodiment, the apparatus further includes: a seventh ALF module.

The seventh ALF module is configured to, before a scale factor corresponding to each class is determined, perform adaptive loop filtering on pixels of each class in the video unit based on classification results of pixel classification.

In an embodiment, the apparatus further includes a DBF module and an SAO module.

The DBF module is configured to, before a loop filtering method is used to filter the first reconstructed picture based on the loop filtering control information, perform DBF filtering on the reconstructed picture.

The SAO module is configured to, after a second reconstructed picture is obtained, perform SAO filtering on the reconstructed picture after being decoded.

In an embodiment, the device further includes a dual filtering module configured to perform DBF filtering and SAO filtering on the reconstructed picture before a loop filtering method is used to filter the first reconstructed picture based on the loop filtering control information.

The video decoding apparatus proposed in this embodiment and the video decoding method proposed in the above embodiments pertain to the same inventive concept. For technical details not described in detail in this embodiment, reference can be made to any of the above embodiments, and this embodiment can achieve the same beneficial effects as those achieved by performing the video decoding method.

Figure 19:
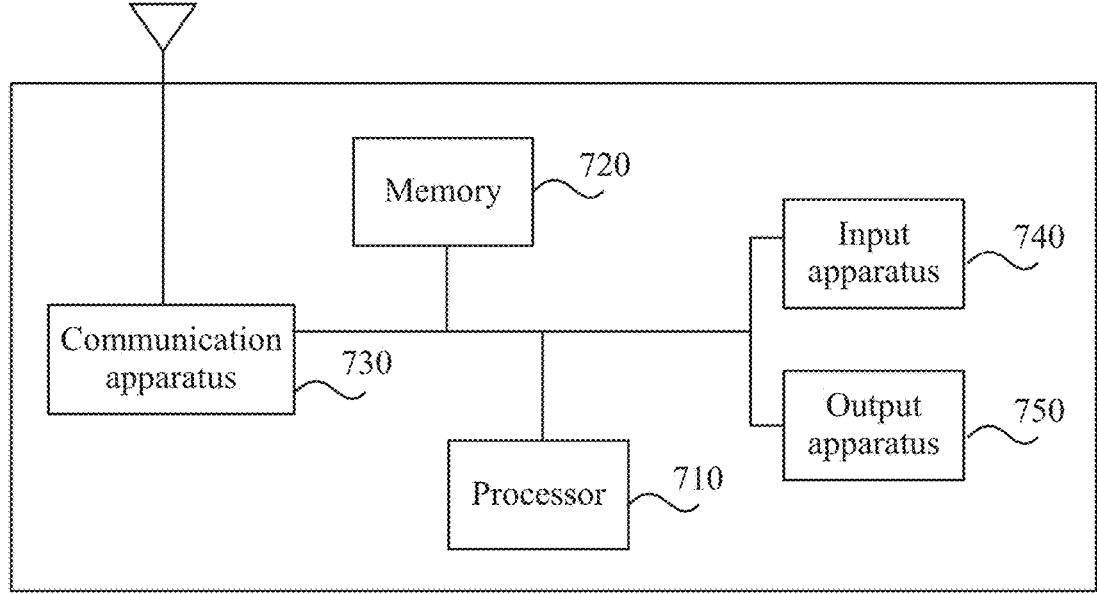
FIG. 19 is a schematic diagram of a hardware structure of an electronic device according to an embodiment.

An electronic device is further provided according to an embodiment of the present application. The electronic device is a picture processing device, which can be an encoding end device or a decoding end device. FIG. 19 is a schematic diagram of a hardware structure of an electronic device according to an embodiment. As shown in FIG. 19, the electronic device according to the present application includes a memory 720, a processor 710, and a program stored in the memory and capable of running on the processor. The processor 710, when executing the program, implements the above loop filtering method, the video encoding method or the video decoding method.

The electronic device further includes a memory 720; there may be one or more processors 710 in the electronic device, and one processor 710 is taken as an example in FIG. 19. The memory 720 is used to store one or more programs; the one or more programs are executed by the one or more processors 710, so that the one or more processors 710 implement the loop filtering method, video encoding method or video decoding method as described in the embodiments of the present application.

The electronic device further includes: a communication apparatus 730, an input apparatus 740, and an output apparatus 750.

The processor 710, the memory 720, the communication apparatus 730, the input apparatus 740 and the output apparatus 750 in the electronic device can be connected through a bus or other means. In FIG. 19, connection through a bus is taken as an example.

The input apparatus 740 may be used to receive input numeric or character information and generate key signal input related to user settings and function control of the electronic device. The output apparatus 750 may include a display device such as a display screen.

The communication apparatus 730 may include a receiver and a transmitter. The communication device 730 is configured to perform information transceiver communication according to the control of the processor 710.

As a computer-readable storage medium, the memory 720 can be configured to store software programs, computer-executable programs and modules, such as program instructions/modules corresponding to the loop filtering method described in the embodiments of the present application (for example, the video unit acquisition module 410, the classification module 420, the determination module 430 and the adjustment module 440 in the loop filtering apparatus). The memory 720 may include a program storage area and a data storage area, where the program storage area may store an operating system and an application program required for at least one function. The storage data area may store data created according to the use of the electronic device, and the like. In addition, memory 720 may include high-speed random access memory, and may further include non-volatile memory, such as at least one magnetic disk storage device, flash memory device, or other non-volatile solid-state storage device. In some examples, the memory 720 may further include a memory located remotely relative to processor 710, and these remote memories may be connected to the electronic device through a network. Examples of the above-mentioned networks include but are not limited to the internet, intranets, local area networks, mobile communication networks and combinations thereof.

A storage medium is further provided according to an embodiment of the present application, the storage medium stores a computer program, and the computer program, when being executed by a processor, implements any method described in the embodiments of the present application. The method may be a loop filtering method, and includes: acquiring a first reconstructed video unit processed by a loop filter; performing pixel classification for the first reconstructed video unit; determining a scale factor corresponding to each class; and performing scale adjustment for the first reconstructed video unit according to the scale factor to obtain a second reconstructed video unit.

Alternatively, the method may be a video encoding method, including: filtering a reconstructed picture of a current picture to obtain a first reconstructed picture; using a loop filtering method to filter the first reconstructed picture to obtain a second reconstructed picture; flagging loop filtering control information of the loop filtering method in a bit stream based on the filtering process; where, the first reconstructed picture includes a first reconstructed video unit, the second reconstructed picture includes a second reconstructed video unit, and the loop filtering method is determined according to the loop filtering method according to any one of the above embodiments.

Alternatively, the method may be a video decoding method, including: acquiring a bit stream containing an encoded video sequence to obtain loop filtering control information related to a loop filtering method; filtering a reconstructed picture of a current picture to obtain a first reconstructed picture; using a loop filtering method to filter the first reconstructed picture based on the loop filtering control information to obtain a second reconstructed picture; where, the first reconstructed picture includes a first reconstructed video unit, the second reconstructed picture includes a second reconstructed video unit, and the loop filtering method is determined according to the loop filtering method according to any one of the above embodiments.

The computer storage medium in the embodiment of the present application may be one or any combination of more computer-readable media. The computer-readable medium may be a computer-readable signal medium or a computer-readable storage medium. The computer-readable storage medium may be, for example, but is not limited to: an electronic, magnetic, optical, electromagnetic, infrared, or semiconductor system, apparatus or device, or any combination thereof. More specific examples (non-exhaustive list) of computer-readable storage media include: electrical connections having one or more conductors, portable computer disks, hard drives, random access memory (RAM), read-only memory (ROM), erasable programmable read only memory (EPROM), flash memory, optical fiber, portable CD-ROM, optical storage device, magnetic storage device, or any suitable combination of the above. A computer-readable storage medium may be any tangible medium that contains or stores a program for use by or in connection with an instruction execution system, apparatus, or device.

A computer-readable signal medium may include a data signal propagated in baseband or as part of a carrier wave carrying computer-readable program code therein. Such propagated data signals may take many forms, including but not limited to: electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device.

Program codes contained on a computer-readable medium may be transmitted using any appropriate medium, including but not limited to: wireless, wire, optical cable, radio frequency (RF), etc., or any suitable combination of the above.

Computer program codes for performing operations of the present application may be written in one or more programming languages, including object-oriented programming languages such as Java, Smalltalk, C++, and conventional procedural programming language, such as the "C" language or similar programming language or combination thereof. The program codes may be executed entirely or partly on the user's computer, as a stand-alone software package, partly on the user's computer and partly on a remote computer or entirely on the remote computer or server. In the situations involving remote computers, the remote computer can be connected to the user's computer through any kind of network, including a local area network (LAN) or a wide area network (WAN), or it can be connected to an external computer (for example, an Internet service provider is utilized to connect through the Internet).

The above descriptions are only exemplary embodiments of the present application and are not intended to limit the protection scope of the present application.

The person skilled in the art should understand that the term user terminal covers any suitable type of wireless user equipment, such as a mobile phone, a portable data processing apparatus, a portable web browser or a vehicle-mounted mobile station.

Generally speaking, the various embodiments of the present application may be implemented in hardware or special purpose circuitry, software, logic, or any combination thereof. For example, some aspects may be implemented in hardware, while other aspects may be implemented in firmware or software that may be executed by a controller, microprocessor, or other computing apparatuses, although the application is not limited thereto.

Embodiments of the present application may be implemented by a data processor of a mobile apparatus executing computer program instructions, for example in a processor entity, or by hardware, or by a combination of software and hardware. Computer program instructions may be assembly instructions, Instruction Set Architecture (ISA) instructions, machine instructions, machine-related instructions, microcode, firmware instructions, state setting data, or source code or object code written in one or any combination of more programming languages.

Any block diagram of a logic flow in the figures of this application may represent program operations, or may represent interconnected logic circuits, modules, and functions, or may represent a combination of program operations and logic circuits, modules, and functions. Computer programs can be stored on memory. The memory may be of any type suitable for the local technical environment and may be implemented using any suitable data storage technology, such as, but not limited to, read-only memory (ROM), random access memory (RAM), optical storage apparatuses and systems (digital video disc (DVD) or compact disk (CD), etc. Computer-readable media may include non-transitory storage media. The data processor can be any type suitable for the local technical environment, such as but not limited to general-purpose computers, special-purpose computers, microprocessors, digital signal processors (DSP), application specific integrated circuits (ASIC), programmable logic devices (Field-Programmable Gate Array, FGPA) and processors based on multi-core processor architecture.

What is claimed is:

1. A loop filtering method, comprising:

acquiring a first reconstructed video unit processed by a loop filter;

performing pixel classification on the first reconstructed video unit;

determining a scale factor corresponding to each class; and performing scale adjustment on the first reconstructed video unit according to the scale factor, to obtain a second reconstructed video unit;

wherein the determining a scale factor corresponding to each class comprises:

integrating pixels of a same class into a same coordinate diagram, wherein a horizontal ordinate of each pixel is an output of the respective pixel after passing through the loop filter, and a vertical ordinate of each pixel is an input of the respective pixel before passing through the loop filter; and fitting the pixels in the coordinate diagram based on a least squares method to obtain a straight line, and taking a slope of the straight line as the scale factor corresponding to the respective class.

2. The method according to claim 1, wherein the loop filter comprises a neural network-based loop filter;

or the first reconstructed video unit and the second reconstructed video unit each comprise one of the following that has been subjected to reconstruction processing: a picture, a slice, a code block, and a code tree block.

3. The method according to claim 1, wherein the performing scale adjustment on the first reconstructed video unit according to the scale factor comprises at least one of the following:

performing scale adjustment on a luma component of the first reconstructed video unit according to the scale factor;

performing scale adjustment on a first chroma component of the first reconstructed video unit according to the scale factor; or performing scale adjustment on a second chroma component of the first reconstructed video unit according to the scale factor;

or wherein the performing scale adjustment on the first reconstructed video unit according to the scale factor comprises one of:

for each pixel in each class, multiplying a difference between the output of the respective pixel after passing through the loop filter and the input of the respective pixel before passing through the loop filter with the scale factor corresponding to the respective class, and adding the multiplication result to the input of the respective pixel before passing through the loop filter to obtain an adjusted pixel value of the respective pixel;

or for pixels of each class, calculating costs of pixels after being subjected to the scale adjustment by using a scale factor corresponding to the respective class with respect to the original pixels;

according to costs corresponding to pixels of a plurality of classes, using scale factors corresponding to part of classes of the plurality of classes to perform scale adjustment on the pixels of the corresponding classes;

or calculating a first cost of a picture obtained after pixels of a plurality of classes are subjected to scale adjustment by using a single scale factor with respect to an original picture;

calculating a second cost of a picture obtained after pixels of the plurality of classes are subjected to scale adjustment by using scale factors corresponding to the respective classes with respect to the original picture; and according to the first cost and the second cost, performing scale adjustment on the first reconstructed video unit by using the single scale factor, or performing scale adjustment on the pixels of the plurality of classes by using the scale factors corresponding to the plurality of classes respectively, wherein the single scale factor is a value set according to statistical information; or, the single scale factor is determined based on a slope of a straight line obtained by fitting each pixel in the first reconstructed video unit;

or calculating a second cost of a video unit obtained after pixels of a plurality of classes are subjected to scale adjustment by using scale factors corresponding to the respective classes with respect to the original video unit;

fusing classes whose corresponding scale factor differences are within a set range into one class;

determining a scale factor corresponding to each fused class;

calculating a third cost of a video unit obtained after pixels of a plurality of fused classes are subjected to scale adjustment by using scale factors corresponding to the respective fused classes with respect to the original video unit; and according to the second cost and the third cost, performing scale adjustment on the pixels of the plurality of classes by using the scale factors corresponding to the respective classes respectively, or performing scale adjustment on the pixels of the plurality of fused classes by using the scale factors corresponding to the respective fused classes respectively;

or for pixels of each class, calculating costs of pixels after being subjected to scale adjustment by using the scale factor corresponding to the respective class with respect to the original pixels;

according to costs corresponding to the pixels of a plurality of classes, flagging switch statuses of scale adjustment corresponding to the plurality of classes respectively by using scale adjustment switch flags; and according to the scale adjustment switch flags, using scale factors corresponding to classes for which the scale adjustment is turned on to perform scale adjustment on pixels of the respective classes;

or calculating a first cost of a video unit obtained after pixels of a plurality of classes are subjected to scale adjustment by using a single scale factor with respect to the original video unit;

calculating a second cost of a video unit obtained after pixels of the plurality of classes are subjected to scale adjustment by using scale factors corresponding to the respective classes with respect to the original video unit;

according to the first cost and the second cost, flagging switch statuses of scale adjustment corresponding to the single scale factor and switch statuses of scale adjustment corresponding to the plurality of classes respectively by using scale adjustment switch flags; and according to the scale adjustment switch flags, using the single scale factor to perform scale adjustment on the pixels of the plurality of classes, or using scale factors corresponding to classes for which the scale adjustment is turned on to perform scale adjustment on pixels of the corresponding classes.

4. The method according to claim 1, wherein a pixel classification method comprises at least one of the following:

performing pixel classification based on luma components;

performing pixel classification based on first chroma components;

performing pixel classification based on second chroma components;

performing pixel classification based on block classification modes;

performing pixel classification based on pixel regions;

performing pixel classification based on classes of neural network-based loop filters;

performing pixel classification based on classification modes used by deblocking filtering (DBF);

performing pixel classification based on classification modes used by sample adaptive offset (SAO) filtering; or performing pixel classification by neural networks for pixel classification;

wherein the performing pixel classification based on block classification modes comprises:

acquiring pixel blocks of the first reconstructed video unit;

calculating a Laplacian gradient of each of the pixel blocks, and calculating a directionality factor and an activity factor based on the Laplacian gradient;

determining a class of the respective pixel block based on at least one of the directionality factor or the activity factor, and determining classes of all pixels in the first reconstructed video unit.

5. A video encoding method, comprising:

filtering a reconstructed picture of a current picture to obtain a first reconstructed picture;

performing, by using a loop filtering method, a filtering process on the first reconstructed picture to obtain a second reconstructed picture;

flagging loop filtering control information of the loop filtering method in a bit stream based on the filtering process;

wherein, the first reconstructed picture comprises a first reconstructed video unit, the second reconstructed picture comprises a second reconstructed video unit, and the loop filtering method is determined based on the loop filtering method according to claim 1.

6. The method according to claim 5, after obtaining the second reconstructed picture, further comprising one of:

performing block classification on the second reconstructed picture; and performing adaptive loop filtering on pixels of each class in the second reconstructed picture; or based on classification results of pixel classification, performing adaptive loop filtering on pixels of each class in the second reconstructed picture.

7. The method according to claim 5, before performing, by using the loop filtering method, the filtering process on the first reconstructed picture, further comprising one of:

performing a block classification on the first reconstructed picture; and based on classification results of the block classification, performing adaptive loop filtering on pixels of each class in the first reconstructed picture; or performing deblocking filtering (DBF) on the reconstructed picture;

and after obtaining the second reconstructed picture, further comprising;

performing sample adaptive offset (SAO) filtering on the second reconstructed picture; or performing DBF filtering and SAO filtering on the reconstructed picture.

8. The method according to claim 5, before determining a scale factor corresponding to each class, further comprising:

based on classification results of pixel classification, performing adaptive loop filtering on pixels of each class in the first reconstructed picture.

9. A video decoding method, comprising:

acquiring a bit stream containing an encoded video sequence to obtain loop filtering control information related to a loop filtering method;

filtering a reconstructed picture of a current picture to obtain a first reconstructed picture;

using a loop filtering method to filter the first reconstructed picture based on the loop filtering control information to obtain a second reconstructed picture;

wherein, the first reconstructed picture comprises a first reconstructed video unit, the second reconstructed picture comprises a second reconstructed video unit, and the loop filtering method is determined based on the loop filtering method according to claim 1.

10. The method according to claim 9, wherein the loop filtering control information comprises at least one of the following:

a sequence-level filtering switch flag of the encoded video sequence, configured to indicate whether to turn on or turn off the loop filtering method for the video sequence in which the current picture is located;

a filtering picture-level flag, configured to indicate that the loop filtering control information appears in picture header information or in slice header information; or loop filter structure information, configured to indicate that a loop filtering is performed on a video unit to which the loop filtering is applied.

11. The method according to claim 10, wherein the video unit comprises a picture or a video slice in a video.

12. The method according to claim 10, wherein the loop filter structure information comprises at least one of the following:

a video unit filtering switch flag, configured to indicate that a video unit has the loop filtering method turned on or turned off;

a video unit component switch flag, configured to indicate a video unit component to which the loop filtering is applied;

a number of video unit classes, configured to indicate a total number of classes for a video unit pixel classification;

a video unit class filtering switch flag, configured to indicate that a plurality of classes in the video unit have the loop filtering method turned on or turned off; or a video unit scale factor, configured to indicate a scale factor corresponding to the video unit or corresponding to a class in the video unit, wherein, the video unit component comprises at least one of the following:

a luma component of a video unit;

a first chroma component of a video unit; or a second chroma component of a video unit;

wherein the using a loop filtering method to filter the first reconstructed picture based on the loop filtering control information comprises:

according to the video unit filtering switch flag, identifying a video unit for which the loop filtering method is turned on in the first reconstructed picture;

according to the video unit component switch flag and the video unit class filtering switch flag, identifying a video unit component to which the loop filtering is applied and a class for which the loop filtering method is turned on in the video unit; and performing scale adjustment on the video unit component of a class for which the loop filtering method is turned on by using the loop filtering method according to the video unit scale factor.

13. The method according to claim 9, after obtaining the second reconstructed picture, further comprising:

based on classification results of pixel classification, performing adaptive loop filtering on pixels of each class in the second reconstructed picture.

14. The method according to claim 9, before using the loop filtering method to filter the first reconstructed picture based on the loop filtering control information, further comprising one of:

performing block classification on the first reconstructed video unit; and based on classification results of the block classification, performing adaptive loop filtering on pixels of each class in the first reconstructed picture; or performing DBF filtering and SAO filtering on the reconstructed picture.

15. The method according to claim 9, before determining a scale factor corresponding to each class, further comprising:

based on classification results of pixel classification, performing adaptive loop filtering on pixels of each class in the first reconstructed video unit.

16. The method according to claim 9, before using the loop filtering method to filter the first reconstructed picture based on the loop filtering control information to obtain the second reconstructed picture, further comprising:

performing deblocking filtering (DBF) on the reconstructed picture;

and after obtaining a second reconstructed picture, further comprising;

performing sample adaptive offset (SAO) filtering on the reconstructed picture after being decoded.

17. An electronic device, comprising a memory, a processor, and a computer program stored in the memory and executable on the processor, the processor, when executing the program, implements the loop filtering method according to claim 1.

18. A non-transitory computer-readable storage medium with a computer program stored thereon, the computer program, when being executed by a processor, implements the loop filtering method according to claim 1.

\* \* \* \* \*